(12) United States Patent
Kinoshita et al.

(10) Patent No.: US 8,718,450 B2
(45) Date of Patent: May 6, 2014

(54) PORTABLE DEVICE, INFORMATION PROCESSING METHOD, AND PROGRAM

(75) Inventors: Akihiko Kinoshita, Tokyo (JP); Hiroyuki Chiba, Kanagawa (JP); Takashi Kanao, Tokyo (JP)

(73) Assignee: Sony Corporation, Tokyo (JP)

( * ) Notice: Subject to any disclaimer, the term of this patent is extended or adjusted under 35 U.S.C. 154(b) by 642 days.

(21) Appl. No.: 12/272,000

(22) Filed: Nov. 17, 2008

(65) Prior Publication Data
US 2009/0129745 A1    May 21, 2009

(30) Foreign Application Priority Data
Nov. 20, 2007    (JP) ................ P2007-300049

(51) Int. Cl.
*H04N 5/761*    (2006.01)

(52) U.S. Cl.
USPC .......................................... 386/296; 386/200

(58) Field of Classification Search
None
See application file for complete search history.

(56) References Cited

U.S. PATENT DOCUMENTS

2006/0041910 A1* 2/2006 Hatanaka et al. ............... 725/58
2006/0153526 A1* 7/2006 Kimura ........................... 386/83
2006/0253874 A1* 11/2006 Stark et al. ..................... 725/62
2008/0118223 A1* 5/2008 Kamiwada et al. ............. 386/83

FOREIGN PATENT DOCUMENTS

| JP | 2001-309285 | 11/2001 |
|---|---|---|
| JP | 2006-54818 | 2/2006 |
| JP | 2006-339747 | 12/2006 |
| JP | 2007-179207 | 7/2007 |
| JP | 2007-189564 | 7/2007 |

* cited by examiner

*Primary Examiner* — William C Vaughn, Jr.
*Assistant Examiner* — Eileen Adams
(74) *Attorney, Agent, or Firm* — Finnegan, Henderson, Farabow, Garrett & Dunner, LLP

(57) ABSTRACT

A portable device includes a setting means that sets a recording reservation; an acquisition means that acquires information that indicates the contents of a recording reservation set in a recording device by requesting the information processing device; an integrating means contained in the portable device that combines a recording reservation set in the portable device with the recording reservation set in the recording device; and a display control means that displays the contents of the recording reservation set in the portable device and the contents of the recording reservation set in the recording device on the basis of the recording reservations combined by the integrating means, and displays information that indicates which recording site the contents will be recorded in, the recording medium of the portable device or a recording medium of the recording device, when recorded in accordance with the respective recording reservations.

7 Claims, 16 Drawing Sheets

PORTABLE DEVICE, INFORMATION PROCESSING METHOD, AND PROGRAM

CROSS REFERENCES TO RELATED APPLICATIONS

The present invention contains subject matter related to Japanese Patent Application JP 2007-300049 filed in the Japanese Patent Office on Nov. 20, 2007, the entire contents of which are incorporated herein by reference.

BACKGROUND OF THE INVENTION

1. Field of the Invention

The present invention relates to a portable device, an information processing method, and a program and, more particularly to a portable device, an information processing method, and a program that are able to integrate the contents of recording reservations set in the portable device with the contents of recording reservations set in a recording device to display the integrated contents of recording reservations.

2. Description of the Related Art

In recent years, there is provided a service that allows the contents of recording reservations set in a home recording device, such as a hard disk recorder or a personal computer with recording capability, to be checked on the screen of a mobile device through a network.

For example, when checking of the contents of recording reservations is instructed by the user, the mobile device sends a request to the recording device via an electronic mail (e-mail). Then, on the basis of information included in an e-mail replied from a server in reply to the request, the contents of recording reservations are displayed on the screen of the mobile device.

By so doing, the user is able to check the contents of recording reservations set in the home recording device away from home.

Incidentally, in recent years, a mobile device that supports one-segment broadcasting begins to become popular. Some of the mobile devices that support one-segment broadcasting have a recording function. The user is able to not only set recording reservations in the mobile device but also watch the recorded contents. In addition, next-generation mobile broadcasting standards, such as ISDB-Tmm or MediaFLO, are proposed. Broadcasting for mobile devices will be widely spread in coming years.

Furthermore, the user may separately use devices to be recorded depending on the contents in such a way that recording reservations for cinema or drama are set in a home recording device, and recording reservations for news are set in a mobile device.

Patent Document 1 Japanese Unexamined Patent Application Publication No. 2007-129397

SUMMARY OF THE INVENTION

In order to check the contents of recording reservations set in a recording device, it may be necessary for the user to use the user interface (UI) of the recording device to do it. On the other hand, in order to check the contents of recording reservations set in a mobile device, it may be necessary to use the UI of the mobile device to do it.

Thus, in order to check the contents of recording reservations set in a plurality of devices, it may be necessary to operate the respective devices to display a list of recording reservations, so it is inconvenient.

If the contents of recording reservations set in a plurality of devices may be collectively checked only through operation for one of the devices, it will improve convenience.

The present invention addresses the above-identified, and other problems associated with existing methods and apparatuses. It is desirable to integrate the contents of recording reservations set in a portable device with the contents of recording reservations set in a recording device to display the integrated contents.

According to an embodiment of the invention, a portable device, having a recording medium and is connected to an information processing device through a network, includes: a setting means that sets a recording reservation; an acquisition means that, when instructed to display a list of recording reservations, acquires information that indicates the contents of a recording reservation set in a recording device by requesting the information processing device; an integrating means that integrates a recording reservation set in the portable device with the recording reservation set in the recording device and indicated by the information acquired by the acquisition means; and a display control means that displays the contents of the recording reservation set in the portable device and the contents of the recording reservation set in the recording device on the basis of the recording reservations integrated by the integrating means together with information that indicates which recording site the contents will be recorded in, the recording medium of the portable device or a recording medium of the recording device, when recorded in accordance with the respective recording reservations. The information processing device, when requested from the portable device, accesses the recording device to acquire the information that indicates the contents of the recording reservation set in the recording device and then transmits the information to the portable device. The acquisition means acquires the information transmitted from the information processing device.

The setting means, when the recording site of the contents when recorded in accordance with a predetermined recording reservation is instructed to change from the recording medium of the portable device to the recording medium of the recording device, may delete the predetermined recording reservation and may request the information processing device to set a recording reservation of the contents, which is the recording target of the predetermined recording reservation, in the recording device. In this case, the information processing device, when requested from the portable device, may access the recording device and instruct the recording device to set a recording reservation of the requested contents.

The setting means, when the recording site of the contents when recorded in accordance with a predetermined recording reservation is instructed to change from the recording medium of the recording device to the recording medium of the portable device, may set a recording reservation of the contents, which is the recording target of the predetermined recording reservation, and may request the information processing device to delete the predetermined recording reservation from the recording device. In this case, the information processing device, when requested from the portable device, may access the recording device and instruct the recording device to delete the recording reservation of the requested contents.

The information processing device, when requested from the portable device, may instruct an information processing device, which is continuously connected to the recording device through a network, to acquire information for accessing the recording device, and may access the recording device on the basis of the acquired information.

According to another embodiment of the invention, an information processing method or the program includes the steps of: setting a recording reservation; when instructed to display a list of recording reservations, acquiring information that indicates the contents of a recording reservation set in a recording device by requesting an information processing device; integrating a recording reservation set in the portable device with the recording reservation set in the recording device and indicated by the acquired information; displaying the contents of the recording reservation set in the portable device and the contents of the recording reservation set in the recording device on the basis of the integrated recording reservations together with information that indicates which recording site the contents will be recorded in, a recording medium of the portable device or a recording medium of the recording device, when recorded in accordance with the respective recording reservations.

In an embodiment of the invention, when recording reservations are set and displaying a list of recording reservations is instructed, information that indicates the contents of a recording reservation set in a recording device is acquired by requesting an information processing device. In addition, the recording reservation set in the portable device is integrated with the recording reservation set in the recording device and indicated by the acquired information, and then the contents of the recording reservation set in the portable device and the contents of the recording reservation set in the recording device are displayed on the basis of the integrated recording reservations together with information that indicates which recording site the contents will be recorded in, a recording medium of the portable device or a recording medium of the recording device, when recorded in accordance with the respective recording reservations.

DESCRIPTION OF THE PREFERRED EMBODIMENTS

Figure 1:
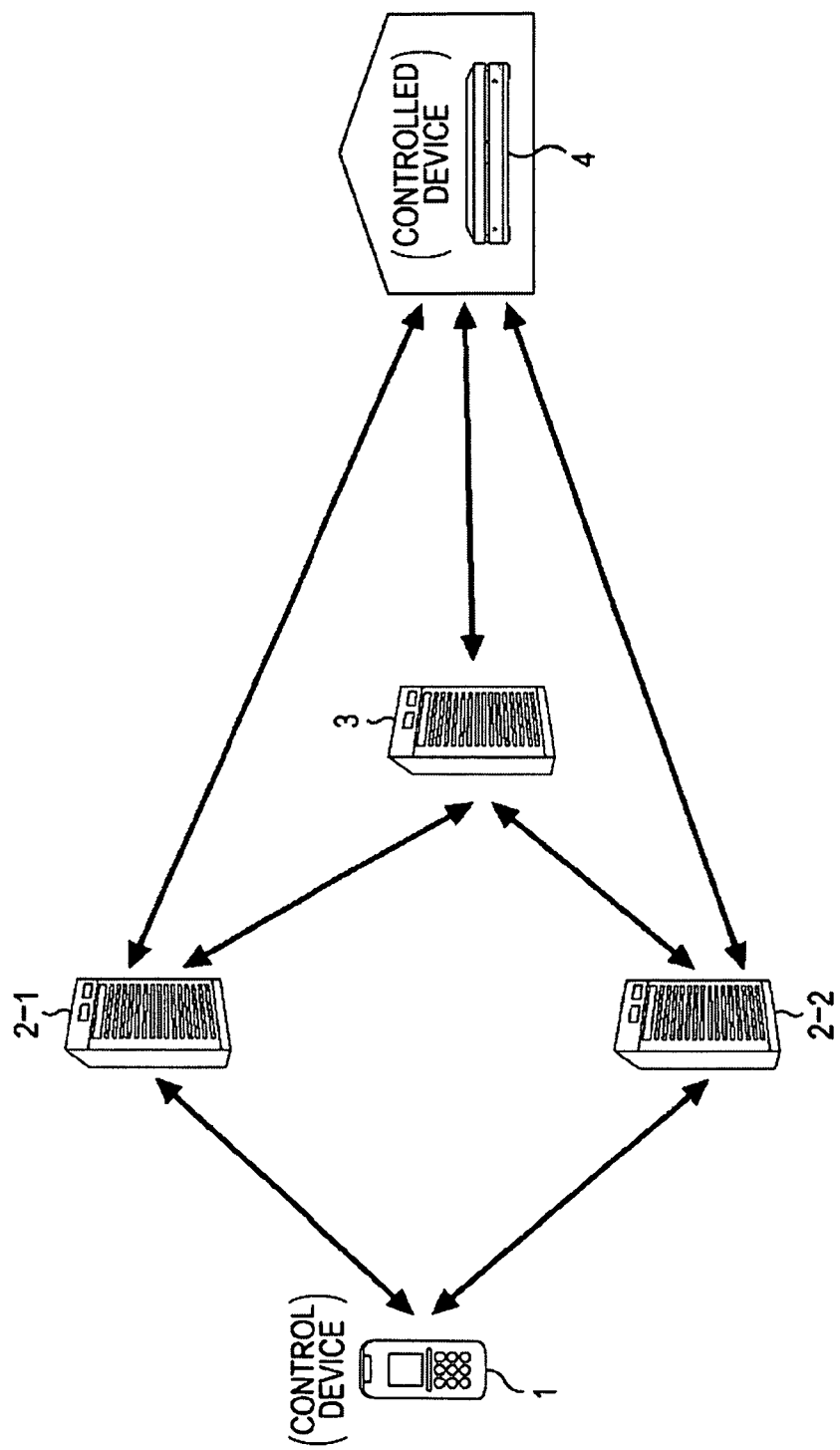
FIG. 1 is a view that shows a configuration example of a communication system according to an embodiment of the invention.

FIG. 1 is a view that shows a configuration example of a communication system according to an embodiment of the invention.

The communication system shown in FIG. 1 includes a mobile device 1, which serves as a control device, service servers 2-1 and 2-2, a direct access platform (DAP) server 3, and a recording device 4, which serves as a controlled device.

Those devices are connected to a network, and as shown by arrows in FIG. 1, the devices are communicable between the control device and the service servers 2-1 and 2-2, between the service servers 2-1 and 2-2 and the DAP server 3, between the service servers 2-1 and 2-2 and the controlled device, and between the DAP server 3 and the controlled device.

The mobile device 1 is a portable device, such as a cellular phone, and is also used as a control device that controls the recording device 4, as a control target, through a network.

The mobile device 1 is able to receive broadcasting for mobile terminals, such as one-segment broadcasting. The mobile device 1 receives the on-air contents, and displays images of the contents on the display or records the contents. Recording of the contents is performed when initiation of recording is instructed by the user or when a broadcast of recording target contents is started in accordance with a preset recording reservation. The user may select recording target contents from a program listing that is displayed on the basis of electronic program guide (EPG) data, and may set a recording reservation.

The mobile device 1 includes a storage unit formed of a memory, and the like. The storage unit stores a reservation list. When recording reservations are set, information that indicates the contents of the reservations are added to the reservation list. The reservation list contains information, such as broadcast start date and time, broadcast time, broadcast channel, and title of the contents, for each recording target contents.

The storage unit of the mobile device 1 stores user identification information that is allocated to the mobile device 1 and, in addition, a program for executing various processes, such as a remote recording reservation process of the contents.

The control device may employ another portable device, such as a notebook personal computer or a personal digital assistance (PDA).

The service servers 2-1 and 2-2 provide a service for controlling controlled devices through a network to the control device. In the example of FIG. 1, the two service servers 2-1 and 2-2 are shown. Instead, for example, more service servers may be prepared for respective services provided. Hereinafter, the case in which the service server 2-1 provides a service will be described. A similar process is also executed in the service server 2-2.

The DAP server 3 collectively manages a correspondence relationship between a combination of a control device and a service the control device receives (service server 2-1 that the control device accesses), and a controlled device, which serves as a control target. The DAP server 3, in reply to requests from respective service servers, provides information for the request service servers to access controlled devices.

That is, when a service for controlling the recording device 4, which serves as the controlled device, through a network is used, the user may need to register information of the recording device 4, which is targeted for control by the mobile device 1, in the DAP server 3 in advance. The detail of the registration will be described later.

Between the DAP server 3 and the service server 2-1, for example, data are exchanged through communication using a simple object access protocol (SOAP).

In the communication using SOAP, a message containing an extensible markup language (XML) document with attached information called envelope is exchanged by a protocol such as hyper text transfer protocol (HTTP) to proceed the process. Because both the client device and the server device have a generation/interpretation engine for SOAP, objects can be called between different environments.

In addition, between the DAP server 3 and the recording device 4, which serves as the controlled device, bidirectional continuous session is established through communication, for example, by extensible messaging and presence protocol (XMPP).

The XMPP is a protocol for implementing real-time communication, and is also used in an instant messenger (IM) service, and the like. In the IM service, IM clients are checked whether they are on-line on the Internet, and a chat and a file swapping may be conducted among the on-line IM clients.

The recording device 4 includes a recording medium such as a hard disk. The recording device 4 records broadcast contents onto the recording medium or reproduces the recorded contents.

The user may select recording target contents from a program listing displayed on a television, or the like, to set recording reservations in the recording device 4.

The recording device 4 has a storage unit that stores a reservation list. When recording reservations are set, information that indicates the contents of the reservations is added to the reservation list. The reservation list, as well as the reservation list stored in the storage unit of the mobile device 1, contains information, such as broadcast start date and time, broadcast time, broadcast channel, and title of the contents, for each recording target contents.

In the example of FIG. 1, the recording device 4 is shown as the controlled device. Instead, a personal computer with recording capability may also serve as the controlled device.

In the communication system of FIG. 1 as constructed above, for example, when the user operating the mobile device 1 instructs remote recording reservations of the contents selected from a program listing displayed on the display of the mobile device 1, the mobile device 1 requests the service server 2-1 of that instruction, and the service server 2-1 acquires information for accessing the recording device 4 from the DAP server 3.

The service server 2-1 accesses the recording device 4 through the network on the basis of the information acquired from the DAP server 3, and then the service server 2-1 instructs the recording device 4 to set the recording reservations of the contents selected by the user of the mobile device 1.

In this way, after the service server 2-1 acquires information for accessing the recording device 4 from the DAP server 3, the service server 2-1 directly accesses the recording device 4 without passing through the DAP server 3.

Hereinafter, the access from the service server 2-1 to the recording device 4 is termed direct access where appropriate. The DAP server 3 may be regarded as a server that provides a platform (direct access platform) for implementing the direct access.

In addition, in the communication system shown in FIG. 1, the user may utilize the mechanism of direct access to display the contents of the recording reservations set in the recording device 4 together with the contents of the recording reservations set in the mobile device 1 on the display of the mobile device 1.

Figure 2:
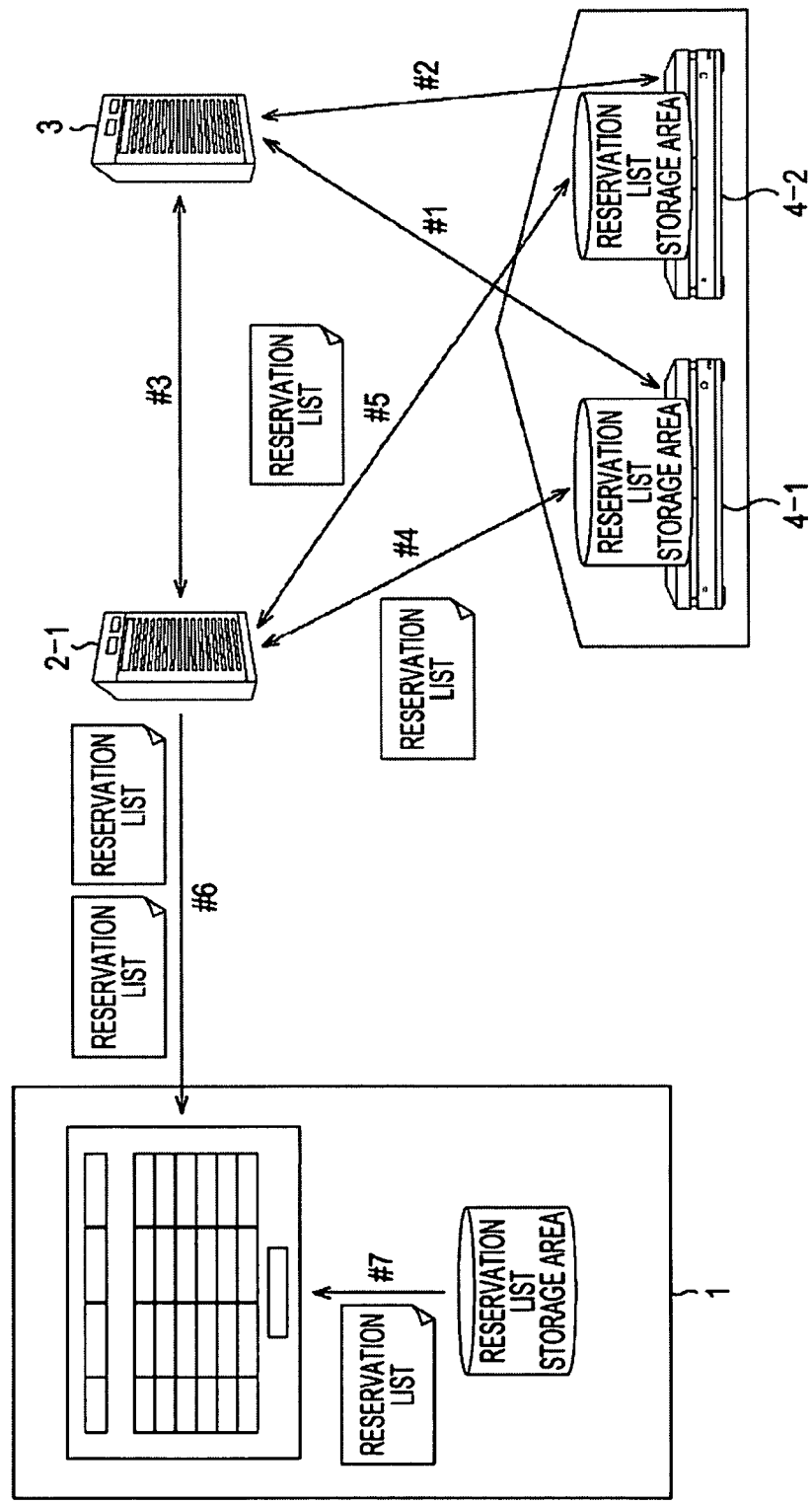
FIG. 2 is a view that shows the overall flow of integrating reservation lists.

FIG. 2 is a view that shows the flow of integrating the reservation list managed in the mobile device 1 with the reservation list managed in the recording device 4.

In the example shown in FIG. 2, a recording device 4-1 and a recording device 4-2 are shown as the controlled devices. FIG. 2 shows an example when the user has installed two recording devices, that is, the recording device 4-1 and the recording device 4-2, at home.

It is assumed that respective pieces of information of the recording device 4-1 and recording device 4-2 are registered in the DAP server 3. After registration is complete and, where necessary, authentication is performed, as shown by arrow #1, a continuous session is established between the recording device 4-1 and the DAP server 3. In addition, as shown by arrow #2, a continuous session is also established between the recording device 4-2 and the DAP server 3.

In each of the recording device 4-1 and the recording device 4-2, a reservation list that contains information indicating the contents of recording reservations is stored in a reservation list storage area and is managed.

In this state, for example, when the user instructs the mobile device 1 to display a list of recording reservations by operating the mobile device 1, the mobile device 1 requests the service server 2-1 to acquire a reservation list.

In reply to the request from the mobile device 1, the service server 2-1 and the DAP server 3 communicate with each other as shown by arrow #3, and then the service server 2-1 acquires a list of the controlled devices associated with the mobile device 1 from the DAP server 3. In this example, the list of the controlled devices acquired from the DAP server 3 contains information of IDs of the recording device 4-1 and recording device 4-2, and the like.

In addition, the service server 2-1 acquires information, such as uniform resource locator (URL), for accessing the recording device 4-1 and information for accessing the recording device 4-2 from the DAP server 3.

When the information for accessing the recording device 4-1 is acquired, as shown by arrow #4, the service server 2-1 directly accesses the recording device 4-1, and acquires a reservation list managed in the recording device 4-1.

In addition, when the information for accessing the recording device 4-2 is acquired, as shown by arrow #5, the service server 2-1 directly accesses the recording device 4-2, and acquires a reservation list managed in the recording device 4-2.

The service server 2-1 transmits the reservation list managed in the recording device 4-1 and the reservation list managed in the recording device 4-2, which are acquired through direct access, to the mobile device 1 as shown by arrow #6.

The mobile device 1 integrates the reservation lists managed respectively in the recording device 4-1 and in the recording device 4-2 with the reservation list read from the internal reservation list storage area as shown by arrow #7, and displays a list of recording reservations on the basis of the integrated reservation list.

Figure 3:
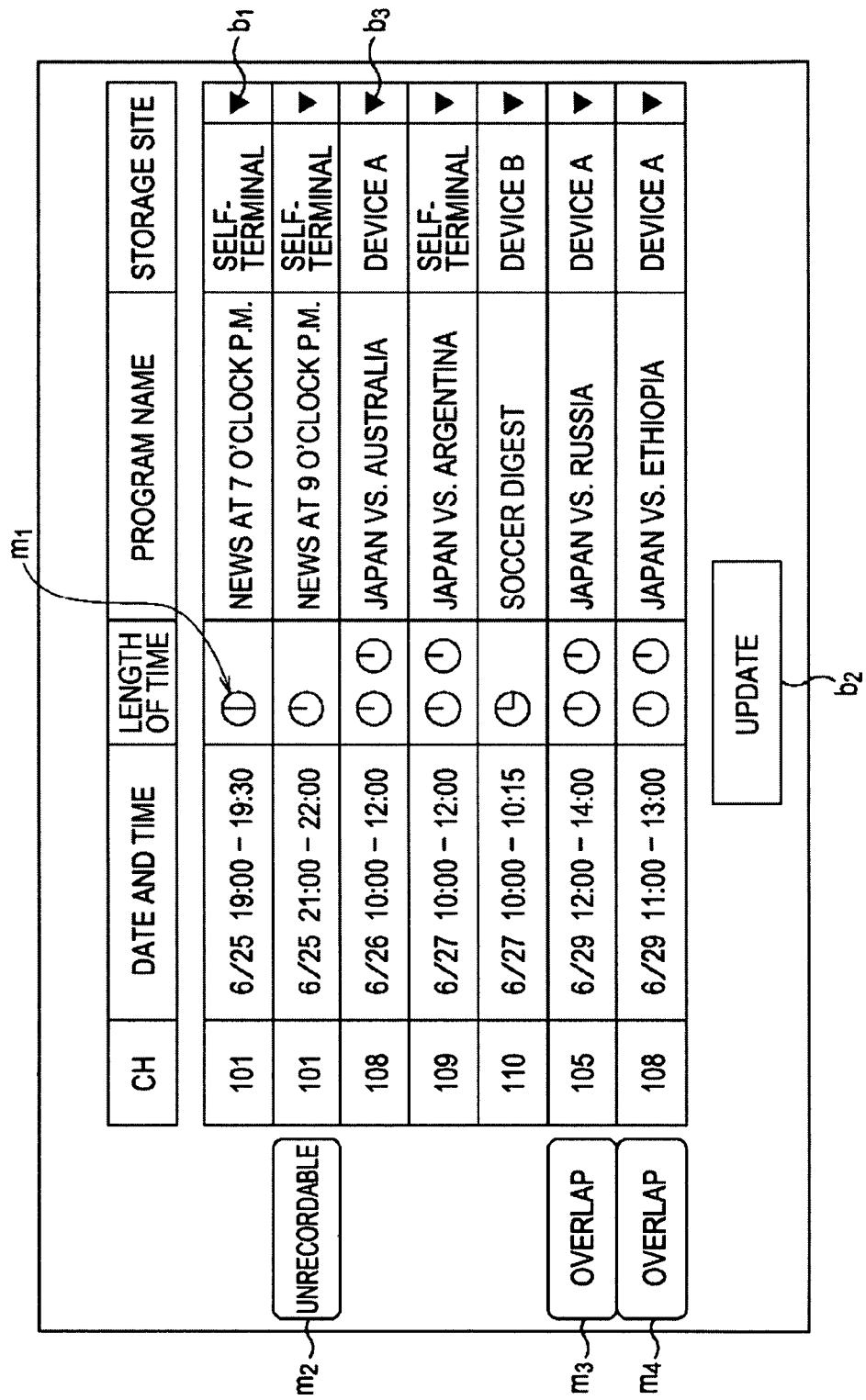
FIG. 3 is a view that shows an example of a list screen of recording reservation.

FIG. 3 is a view that shows an example of a list screen of recording reservations displayed on the display of the mobile device 1.

As shown in FIG. 3, the list of recording reservations shows information of broadcast channel, broadcast date and time, length of time (broadcast time), program name, and storage site, for each recording target contents.

The storage site (recording site) indicates a device in which recording reservations are set, that is, a recording medium of which device the recording site of the contents will be, when recorded in accordance with the set recording reservation. "Self-terminal" indicates that the recording site of the contents will be the recording medium of the mobile device 1. "Device A" indicates that the recording site of the contents will be the recording medium of the recording device 4-1. "Device B" indicates that the recording site of the contents will be the recording medium of the recording device 4-2.

The broadcast channel of the contents intended by the topmost recording reservation in FIG. 3 is "101", and the broadcast date and time is "6/25 19:00-19:30". A mark m1 indicates that the broadcast time is 30 minutes, and the program name is "News at 7 o'clock p.m.". In addition, the recording site is "Self-terminal".

That is, the topmost recording reservation is a recording reservation set in the mobile device 1 by the user, and information of this recording reservation is displayed on the basis of the contents of the reservation list managed in the mobile device 1.

A mark that indicates broadcast time of contents represents an hour per one mark. The length of time within an hour is expressed by color assigned to one mark.

On the other hand, the broadcast channel of the contents intended by the third recording reservation from the top in FIG. 3 is "108", and the broadcast date and time is "6/26 10:00-12:00". The broadcast time is two hours, and the program name is "Japan vs. Australia". In addition, the recording site is "Device A".

That is, the third recording reservation from the top is a recording reservation set in the recording device 4-1 by the user, and information of this recording reservation is displayed on the basis of the reservation list managed in the recording device 4-1.

From the above described screen, the user is able to not only check the contents of the recording reservations set in the mobile device 1 but also check the contents of the recording reservations set in the recording devices 4-1 and 4-2.

Note that when a recording reservation intended for the same contents is set in a plurality of devices, pieces of information of the recording reservations intended for the same contents are displayed side by side for the number of devices in which the same recording reservation is set. Thus, the user is able to easily check whether a recording reservation intended for the same contents is set in a plurality of devices.

The user is able to not only check the contents of the recording reservations set in each device but also easily change the recording site of contents from the screen.

For example, when an inverted triangle button b1 displayed in the recording site field of the topmost recording reservation is pressed, a list of recording sites that are selectable as the recording site of the contents "News at 7 o'clock p.m." is displayed as a pull-down menu.

In this example, the list of recording sites shows the names of the devices, that is, "Self-terminal" that indicates the mobile device 1, "Device A" that indicates the recording device 4-1, and "Device B" that indicates the recording device 4-2. When "Device A" is selected from the list of recording sites, "Device A" is displayed in the recording site field for the contents of "News at 7 o'clock p.m.", in place of "Self-terminal".

When an update button b2 at the lower side of the screen is pressed while "Device A" is displayed in the recording site field for the contents "News at 7 o'clock p.m.", the recording reservation intended for the contents "News at 7 o'clock p.m." and set in the mobile device 1 is deleted. In addition, instead, the recording reservation for the contents "News at 7 o'clock p.m." is newly set in the recording device 4-1. Setting the recording reservation for the contents "News at 7 o'clock p.m." in the recording device 4-1 is also performed through direct access.

Similarly, when an inverted triangle button b3 displayed in the recording site field for the third recording reservation from the top is pressed, a list of recording sites that are selectable as the recording site of the contents "Japan vs. Australia" is displayed as a pull-down menu.

When "Self-terminal" is selected from the list of recording sites, "Self-terminal" is displayed in the recording site field for the contents "Japan vs. Australia" in place of "Device A".

When the update button b2 is pressed while "Self-terminal" is displayed in the recording site field for the contents "Japan vs. Australia", the recording reservation intended for the contents "Japan vs. Australia" and set in the recording device 4-1 is deleted. In addition, instead, the recording reservation for the contents "Japan vs. Australia" is newly set in the mobile device 1. Deleting the recording reservation for the contents "Japan vs. Australia" from the recording device 4-1 is also performed through direct access.

In this way, the user is able to check the status of recording reservations in each device from the list screen and review the set recording reservations.

For example, when the recording medium has small free space and it is difficult for the mobile device 1 to perform recording in accordance with the set recording reservations, the user is able to operate the mobile device 1 to instruct another device to record the contents that are supposed to be recorded in the mobile device 1.

A mark m2 shown in FIG. 3 indicates that it is difficult to record the contents "News at 9 o'clock p.m." in accordance with the second recording reservation from the top. With the mark m2 being displayed, the user is able to check the recording reservations that may be subjected to user's review.

In addition, when the contents having long broadcast time if watched by the portable mobile device 1, the user is able to change the recording reservation so that the contents will be recorded in the recording device 4-1. The user is able to recognize the broadcast time of each contents from the number of marks displayed in the broadcast time field or color-coding.

Furthermore, when the broadcast date and time of the contents overlaps the broadcast date and time of another recording target contents, the user is able to change the recording reservation so as to record one of the pieces of the contents in another device.

Marks m3 and m4 shown in FIG. 3 indicate that the broadcast time of the contents "Japan vs. Russia" intended by the sixth recording reservation from the top and displayed to the right of the mark m3 partially overlaps the broadcast time of the contents "Japan vs. Ethiopia" intended by the seventh recording reservation from the top and displayed to the right of the mark m4.

In this example, the broadcast date and time of the contents "Japan vs. Russia" is "6/29 12:00-14:00", and the broadcast date and time of the contents "Japan vs. Ethiopia" is "6/29 11:00-13:00". Because both recording reservations are set in the recording device 4-1, unless the recording device 4-1 has a function to record multiple pieces of contents at the same time, it is difficult for the recording device 4-1 to record either one of the pieces of contents during a time period between "12:00-13:00" in which the broadcast dates and times overlap each other.

When this case is recognized from the list screen, the user is able to, for example, change the recording site of the contents "Japan vs. Russia" to another device to thereby record both pieces of contents, that is, the contents "Japan vs. Russia" and the contents "Japan vs. Ethiopia".

The process executed by the devices for displaying the above described screen and the process executed by the devices when recording site change is operated will be described later with reference to flowcharts.

Here, initial registration, which is performed as preprocessing for controlling a controlled device using direct access, will be described.

In order to control a controlled device using direct access, it may be necessary for devices to respectively identify which device is a communication target from among devices connected to the network. The initial registration registers information for the identification in the DAP server 3.

Figure 4:
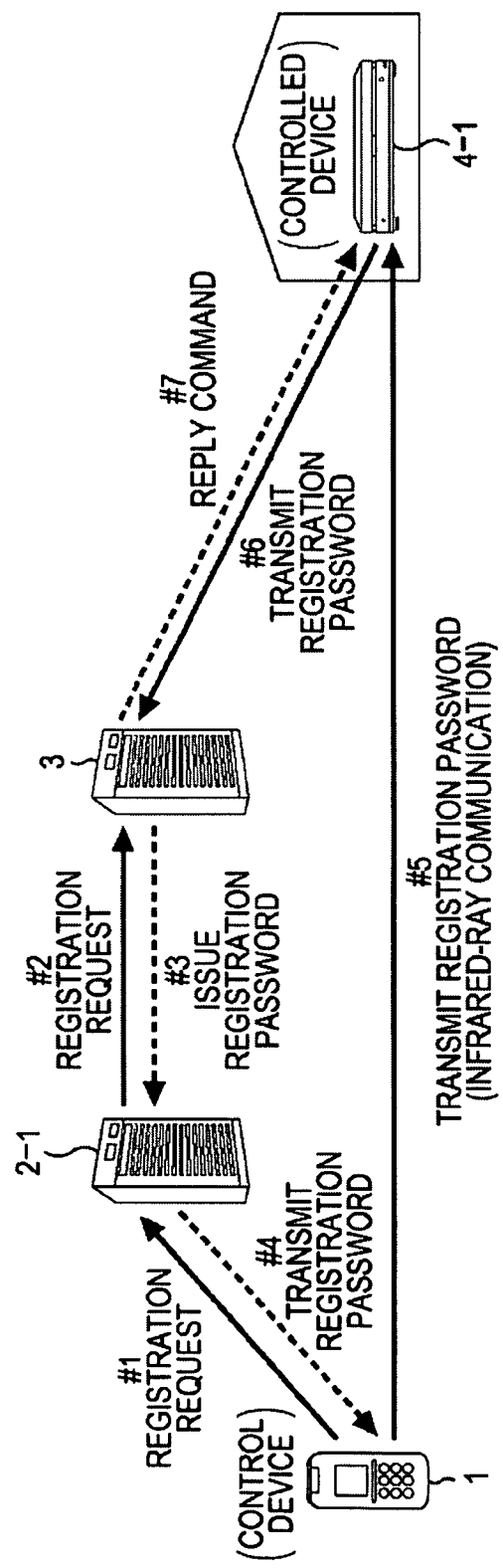
FIG. 4 is a view that shows the overall flow of initial registration.

FIG. 4 is a view that shows the overall flow of the initial registration. The detail will be described later with reference to a flowchart. Here, the process of registering information of the recording device 4-1 will be described. A similar process will be executed when information of the recording device 4-2 is registered.

The initial registration is initiated when the user provides instruction to perform the initial registration from a menu screen displayed on the display of the mobile device 1, which serves as the control device.

The initial registration basically includes a process of registering a combination of the control device and a service in the DAP server 3, and a process of registering a correspondence between a combination of the control device and the service and a controlled device in the DAP server 3. In reply to the request from the mobile device 1, the former registration process of the above processes is initiated.

When the instruction for performing the initial registration is provided, as shown by arrow #1 in FIG. 4, the mobile device 1 transmits a registration request to the service server 2-1.

When the request from the mobile device 1 is received, as shown by arrow #2, the service server 2-1 transmits a registration request to the DAP server 3.

The DAP server 3 that has received the request from the service server 2-1 generates a registration password and generates an ID (control device-service management ID, which will be described later) that indicates a combination of a service provided by the service server 2-1 and the mobile device 1 that uses the service, and then registers the generated registration password and the ID associated with each other.

The DAP server 3 transmits and issues the generated registration password to the service server 2-1, as shown by arrow #3.

The registration password issued from the DAP server 3 is, as shown by arrow #4, transmitted from the service server 2-1 to the mobile device 1 and is stored in the storage unit of the mobile device 1.

Then, the user is able to register the recording device 4-1 as the controlled device in the DAP server 3 by transmitting the registration password to the recording device 4-1.

For example, when the user is at home and provides instruction for transmitting the registration password by directing an infrared-ray signal output unit of the mobile device 1 toward the recording device 4-1, the mobile device 1 transmits the registration password to the recording device 4-1 as shown by arrow #5. At this time, the above described latter registration process of registering a correspondence between a combination of the control device and the service, and a controlled device in the DAP server 3 is initiated.

The recording device 4-1, as shown by arrow #6, transmits the registration password to the DAP server 3 to request that the recording device 4-1 itself be recorded as the controlled device.

When the registration password issued to the service server 2-1 coincides with the registration password transmitted from the recording device 4-1, the DAP server 3 registers an ID allocated to the recording device 4-1 in association with the ID registered to indicate a combination of the service provided by the service server 2-1 and the mobile device 1 that uses the service.

When registration of the ID of the recording device 4-1 is complete, the DAP server 3, as shown by arrow #7, transmits, to the recording device 4-1, a reply command that indicates reception of the registration password.

By so doing, the correspondence relationship between a combination of the mobile device 1 used by the user as the control device and the service provided for the mobile device 1 and the recording device 4-1, which serves as the controlled device, is registered in the DAP server 3.

Figure 5:
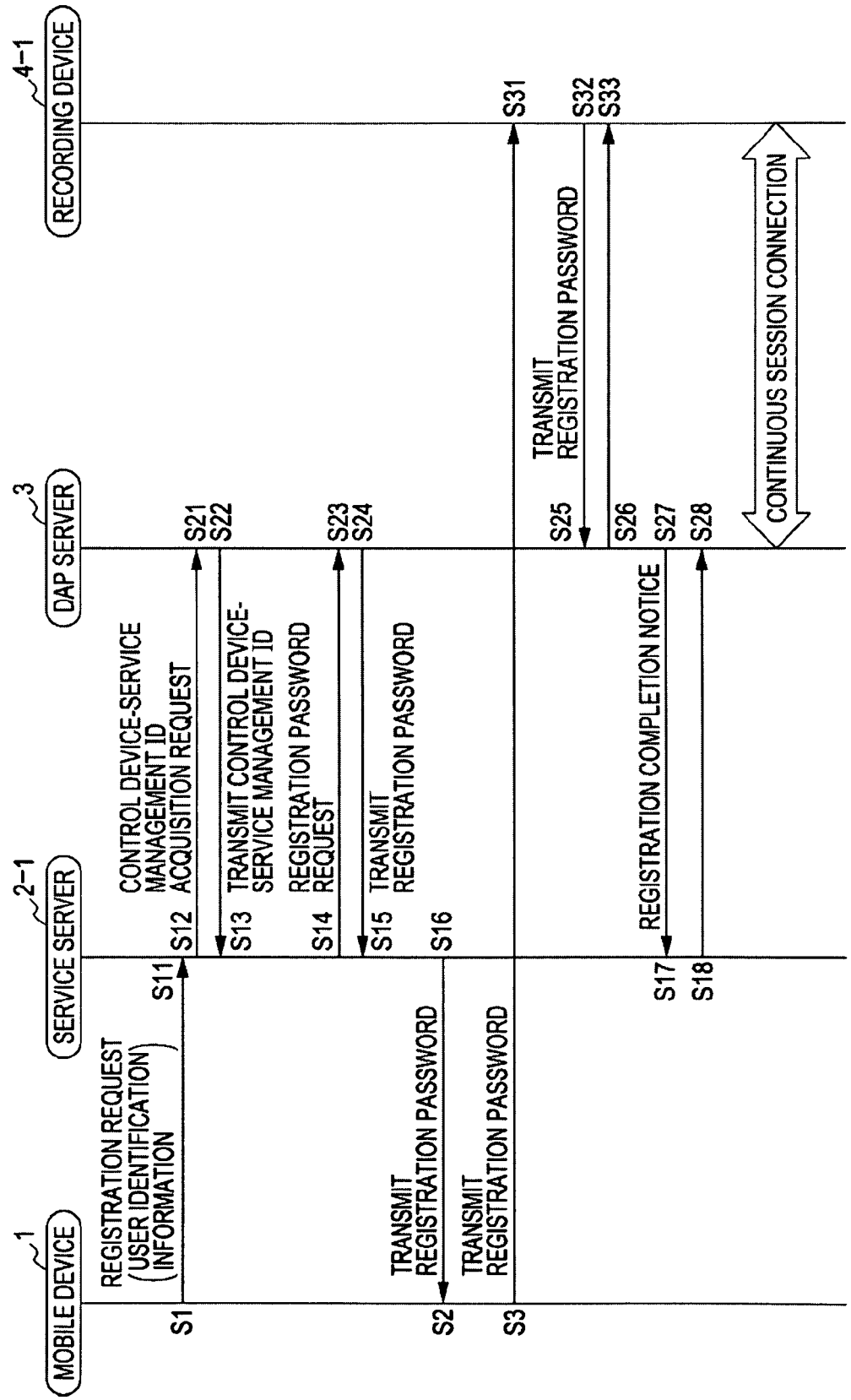
FIG. 5 is a flowchart that illustrates the processes of devices during the initial registration.

Next, the processes of the devices during the initial registration will be described with reference to the flowchart of FIG. 5.

When the user provides instruction for initiating the initial registration, in step S1, the mobile device 1 transmits a registration request to the service server 2-1.

In step S11, the service server 2-1 receives the registration request transmitted from the mobile device 1 and stores user identification information, included in the received request, in the storage unit.

In step S12, the service server 2-1 transmits a control device-service management ID acquisition request, which includes a service ID stored in the storage unit, to the DAP server 3. The control device-service management ID is uniquely allocated to a combination of a service provided by each service server and a control device that receives the service.

In step S21, the DAP server 3 receives the control device-service management ID acquisition request transmitted from the service server 2-1, and generates a new control device-service management ID. The DAP server 3 stores the generated control device-service management ID in the storage unit.

In step S22, the DAP server 3 transmits the control device-service management ID to the service server 2-1.

In step S13, the service server 2-1 receives the control device-service management ID transmitted from the DAP server 3, and stores the received control device-service management ID in the storage unit in association with the user identification information of the mobile device 1.

In step S14, the service server 2-1 transmits a registration password issuance request to the DAP server 3. The registration password issuance request transmitted from the service server 2-1 contains the control device-service management ID.

In step S23, the DAP server 3 receives the request transmitted from the service server 2-1. Because the control device-service management ID included in the request from the service server 2-1 has been already stored in the storage unit, the DAP server 3 generates a new registration password.

In step S24, the DAP server 3 transmits the registration password and its expiration information to the service server 2-1, and stores the registration password in the storage unit in association with the control device-service management ID.

In step S15, the service server 2-1 receives the registration password and its expiration information, received from the DAP server 3.

In step S16, the service server 2-1 transmits the registration password and its expiration information together with the control device-service management ID to the mobile device 1.

In step S2, the mobile device 1 receives the information transmitted from the service server 2-1, and stores the received control device-service management ID, registration password and its expiration information in the storage unit.

When the user provides instruction for transmitting the registration password, in step S3, the mobile device 1 transmits the registration password, issued from the DAP server 3, to the recording device 4-1 through infrared-ray communication. Other than the infrared-ray communication, the registration password may be transmitted to the recording device 4-1 through communication via a USB cable, communication by a wireless local area network (LAN), or communication between a noncontact IC card and a reader/writer.

In step S31, the recording device 4-1 receives the registration password transmitted from the mobile device 1.

In step S32, the recording device 4-1 transmits a registration request that includes the registration password transmitted from the mobile device 1 to the DAP server 3 through a continuous session.

In step S25, the DAP server 3 receives the request from the recording device 4-1, and checks whether the registration password included in the received request coincides with the one stored in the storage unit and also checks the expiration of the registration password.

When it is confirmed that the registration password coincides with the one stored in the storage unit and the registration password is not expired, the DAP server 3 associates the controlled device ID of the recording device 4-1 with the control device-service management ID that is registered in association with the registration password transmitted from the recording device 4-1. The controlled device ID is identification information that is uniquely allocated to each controlled device in the DAP server 3.

By so doing, the control device-service management ID is associated with the controlled device ID allocated to the recording device 4-1. The DAP server 3 is now able to identify the control target controlled device on the basis of the control device-service management ID.

Note that a plurality of controlled device IDs may be associated with one control device-service management ID, or a plurality of control device-service management IDs may be associated with one controlled device ID.

In step S26, the DAP server 3 transmits, to the recording device 4-1, a reply command that indicates reception of the registration password.

In step S33, the recording device 4-1 receives the notice from the DAP server 3.

In step S27, the DAP server 3 notifies the service server 2-1 that the initial registration is complete.

In step S17, the service server 2-1 receives the notice from the DAP server 3, and in step S18, transmits a reply command to the DAP server 3.

In step S28, the DAP server 3 receives the reply command transmitted from the service server 2-1, and completes the initial registration process. After the initial registration process is complete, a continuous session is established between the DAP server 3 and the recording device 4-1.

Through the above processes, the user is able to register the information of the recording device 4-1 in the DAP server 3 only by transmitting the registration password to the control target recording device 4-1.

Next, a remote recording reservation that is performed through direct access will be described.

Figure 6:
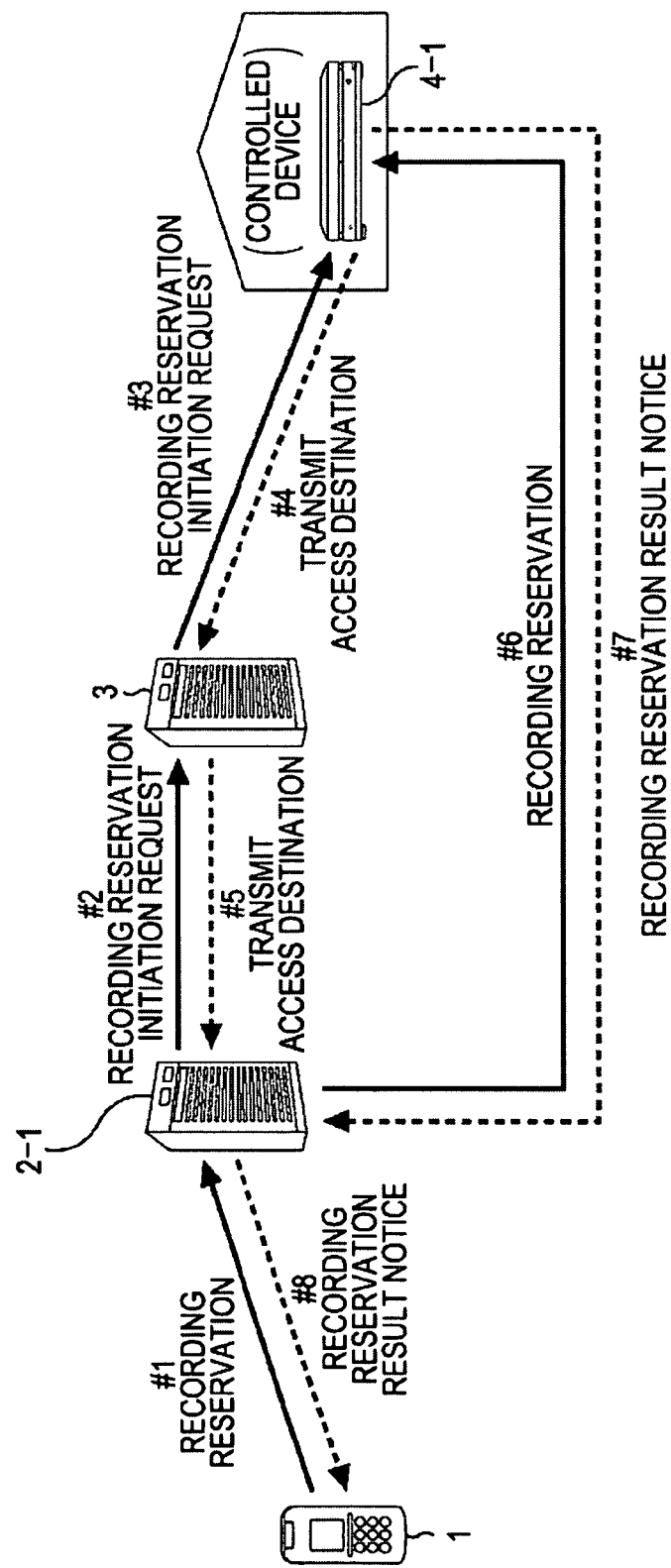
FIG. 6 is a view that shows the overall flow of remote recording reservation.

FIG. 6 is a view that shows the overall flow of the remote recording reservation. The detail will be described later with reference to the flowchart.

The remote recording reservation is initiated, for example, when the user selects predetermined contents from a program listing displayed on the display of the mobile device 1, and provides instruction for setting the recording reservation to the recording device 4-1. It is assumed that a continuous session is established between the DAP server 3 and the recording device 4-1.

When setting the recording reservation is instructed, as shown by arrow #1 of FIG. 6, the mobile device 1 transmits a remote recording reservation request to the service server 2-1. The request from the mobile device 1 contains information of the recording target contents.

When the request from the mobile device 1 is received, the service server 2-1 transmits a request for initiating the recording reservation to the DAP server 3 as shown by arrow #2. In reply to the request, the DAP server 3 acquires information for direct access.

When the request from the service server 2-1 is received, the DAP server 3 transmits a request for initiating the recording reservation to the recording device 4-1 as shown by arrow #3.

In reply to the request from the DAP server 3, the recording device 4-1 performs various settings for accepting direct access from the service server 2-1. When the settings are complete, the recording device 4-1, as shown by arrow #4, transmits access destination information, such as URL allocated for direct access, to the DAP server 3.

The access destination information is, as shown by arrow #5, transmitted from the DAP server 3 to the service server 2-1.

When the access destination information is received, the service server 2-1, as shown by arrow #6, directly accesses the recording device 4-1 on the basis of the access destination information and instructs the recording device 4-1 to set the recording reservation.

When the setting of the recording reservation is complete, the recording device 4-1, as shown by arrow #7, notifies the service server 2-1 that the setting of the recording reservation is complete as a processing result.

The service server 2-1 transmits the notice from the recording device 4-1 to the mobile device 1 as shown by arrow #8, and notifies that the setting of the recording reservation is complete.

Figure 7:
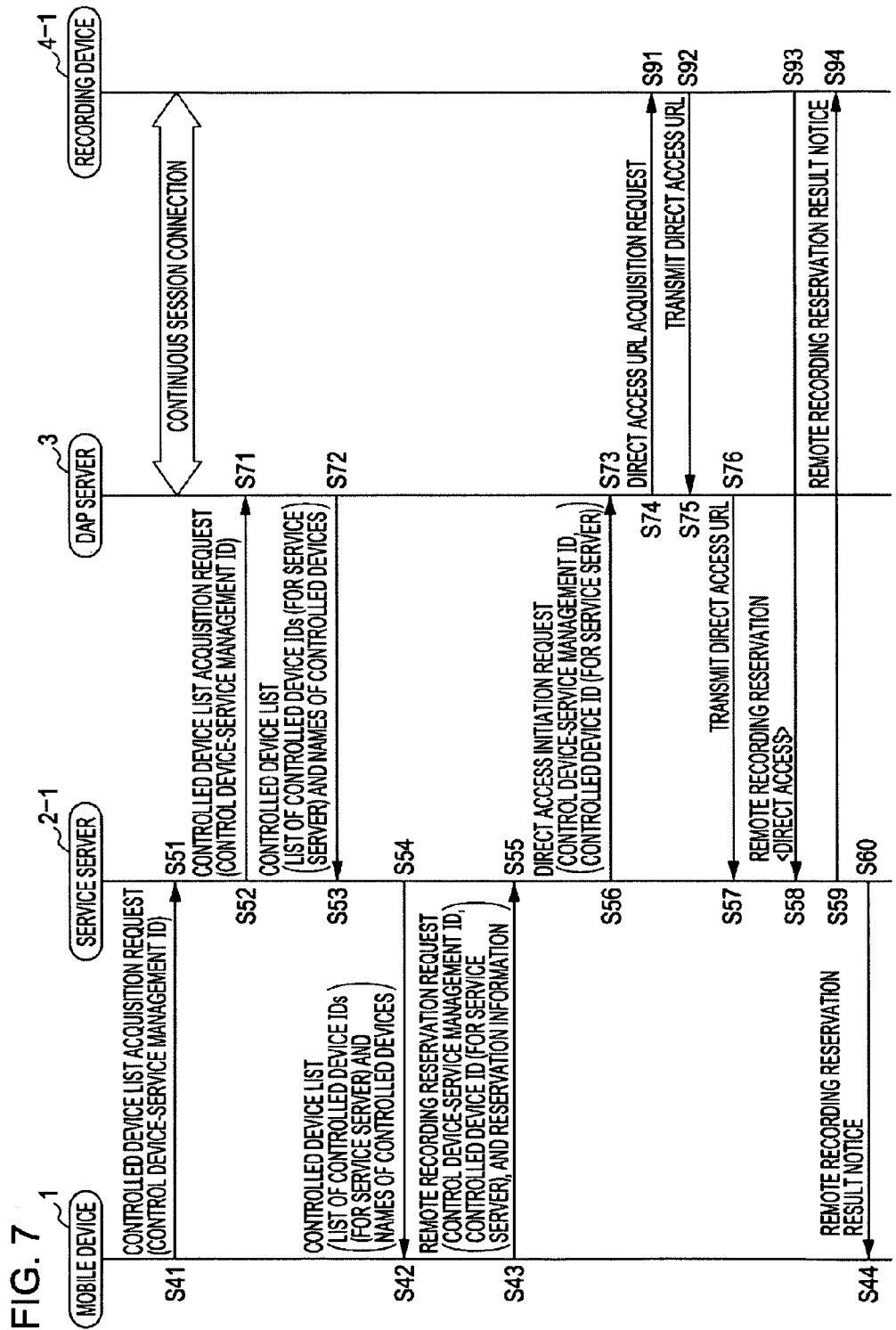
FIG. 7 is a flowchart that illustrates the processes of devices during the remote recording reservation.

Next, the processes of the devices during remote recording reservation will be described with reference to a flowchart of FIG. 7.

When a remote recording reservation is instructed by the user, in step S41, the mobile device 1 transmits a controlled device list acquisition request to the service server 2-1. The request contains the control device-service management ID transmitted from the service server 2-1 at the time of initial registration.

In step S51, the service server 2-1 receives a request from the mobile device 1.

In step S52, the service server 2-1 transmits a controlled device list acquisition request to the DAP server 3. The controlled device list acquisition request contains the control device-service management ID.

In step S71, the DAP server 3 receives the request from the service server 2-1, and acquires a controlled device ID that is registered in association with the control device-service management ID included in the received request. When the initial registration has been performed, the storage unit of the DAP server 3 stores the control device-service management ID in association with the controlled device ID of the recording device 4-1, which serves as the controlled device.

In addition, when the names of the controlled devices, such as device A or device B, are also registered at the time of initial registration, the DAP server 3 acquires the device name of the specified controlled device.

In step S72, the DAP server 3 generates a controlled device list that is a list of controlled devices controllable from the mobile device 1, and transmits the generated controlled device list to the service server 2-1. The controlled device list contains the names of the controlled devices and controlled device IDs.

In step S53, the service server 2-1 receives the controlled device list transmitted from the DAP server 3, and in step S54, transmits the controlled device list to the mobile device 1.

In step S42, the mobile device 1 receives the controlled device list transmitted from the service server 2-1, and displays a list of controlled devices on the display on the basis of the controlled device list. The user is able to select the recording device 4-1, as a device for setting the remote recording reservation, from among the devices displayed in the list.

When the recording target contents are selected from a program listing and the controlled device, which is the recording reservation setting destination, is selected, in step S43, the mobile device 1 transmits a remote recording reservation request to the service server 2-1. The request from the mobile device 1 contains the control device-service management ID, the controlled device ID that specifies the recording device 4-1, which is the recording reservation setting destination, and reservation information. The reservation information contains identification information of the recording target contents, information of channel number, broadcast date and time, and the like.

In step S55, the service server 2-1 receives the remote recording reservation request transmitted from the mobile device 1.

In step S56, the service server 2-1 transmits a request for initiating direct access to the DAP server 3. The request from the service server 2-1 contains the control device-service management ID and controlled device ID transmitted from the mobile device 1.

In step S73, the DAP server 3 receives a request from the service server 2-1.

In step S74, the DAP server 3 identifies the recording device 4-1 as the direct access target device on the basis of the controlled device ID transmitted from the service server 2-1. The DAP server 3 requests the recording device 4-1 to acquire direct access URL through a continuous session established between the DAP server 3 and the recording device 4-1.

The direct access URL is allocated to the recording device 4-1 by itself for accepting direct access. The direct access URL corresponds to access destination information for the service server 2-1 to directly access the recording device 4-1.

In step S91, the recording device 4-1 receives the request transmitted from the DAP server 3, and performs settings for accepting direct access. For example, the recording device 4-1 requests a home router to open a local port for accepting direct access or allocates direct access URL.

In step S92, the recording device 4-1 transmits the direct access URL to the DAP server 3.

In step S75, the DAP server 3 receives the direct access URL and in step S76, transmits the direct access URL to the service server 2-1.

In step S57, the service server 2-1 receives the direct access URL transmitted from the DAP server 3.

In step S58, the service server 2-1 directly accesses the recording device 4-1 on the basis of the direct access URL, and transmits the reservation information transmitted from the mobile device 1 to thereby perform remote recording reservation.

In step S93, the recording device 4-1 sets the recording reservation for the contents selected by the user on the basis of the reservation information transmitted from the service server 2-1.

When the setting of the recording reservation is complete, in step S94, the recording device 4-1 notifies the service server 2-1 that the remote recording reservation is complete.

In step S59, the service server 2-1 receives the notice from the recording device 4-1, and in step S60, notifies the mobile device 1 that the remote recording reservation is complete.

In step S44, the mobile device 1 receives the notice transmitted from the service server 2-1.

Through the above processes, the user is able to use the mobile device 1 to set the recording reservation in the recording device 4-1.

Figure 8:
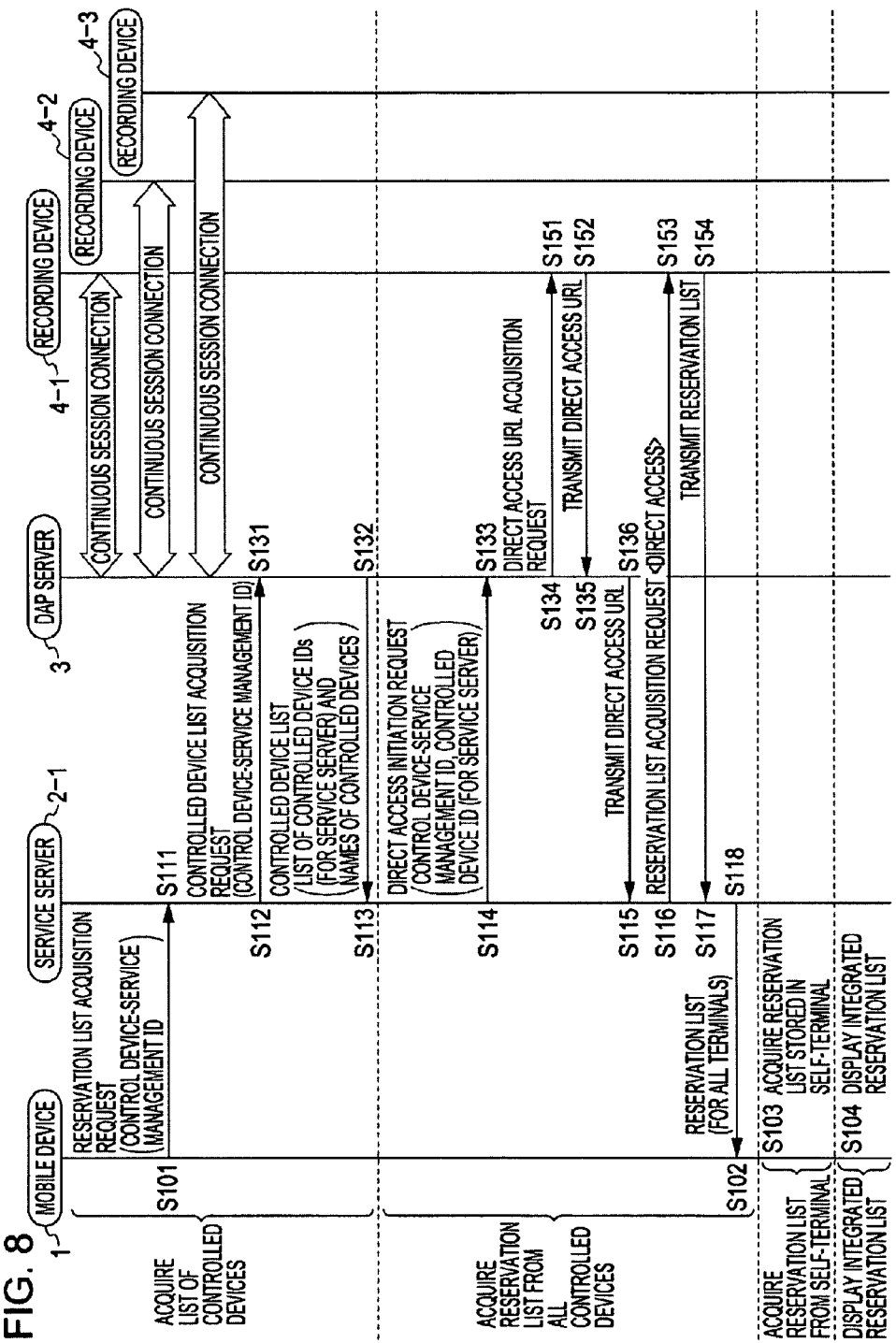
FIG. 8 is a flowchart that illustrates the processes of devices during integration of reservation lists.

Next, the processes of the devices during integration of reservation lists will be described with reference to a flowchart shown in FIG. 8.

When displaying a list of recording reservations is instructed by the user, in step S101, the mobile device 1 transmits a reservation list acquisition request to the service server 2-1. The request contains the control device-service management ID.

In step S111, the service server 2-1 receives the request from the mobile device 1.

In step S112, the service server 2-1 transmits the controlled device list acquisition request to the DAP server 3. The controlled device list acquisition request contains the control device-service management ID.

In step S131, the DAP server 3 receives the request from the service server 2-1, and acquires a controlled device ID that is registered in association with the control device-service management ID contained in the received request. When initial registration of a recording device 4-3 has been performed in addition to the recording device 4-1 and the recording device 4-2, the storage unit of the DAP server 3 stores those controlled device IDs in association with the control device-service management IDs.

In addition, when the names of the controlled devices are also registered at the time of initial registration, the DAP server 3 acquires the names of the controlled devices.

In step S132, the DAP server 3 generates a controlled device list, and transmits the generated controlled device list to the service server 2-1.

In step S113, the service server 2-1 receives the controlled device list transmitted from the DAP server 3.

In step S114, the service server 2-1 transmits a request for initiating direct access to the DAP server 3. The request from the service server 2-1 contains the control device-service management ID, and the controlled device ID of the controlled device that makes the controlled device list and that manages a reservation list. For example, the recording devices 4-1 to 4-3, of which the controlled device IDs make the reservation list, are sequentially focused on one by one from the recording device 4-1, and the controlled device ID of the focused device is contained in the request.

In step S133, the DAP server 3 receives the request from the service server 2-1.

In step S134, the DAP server 3 identifies the recording device 4-1 as the direct access target device on the basis of the controlled device ID transmitted from the service server 2-1. The DAP server 3 requests the recording device 4-1 to acquire direct access URL through a continuous session established between the DAP server 3 and the recording device 4-1.

In step S151, the recording device 4-1 receives the request transmitted from the DAP server 3, and performs settings for accepting direct access.

In step S152, the recording device 4-1 transmits the direct access URL to the DAP server 3.

In step S135, the DAP server 3 receives the direct access URL, and in step S136, transmits the direct access URL to the service server 2-1.

In step S115, the service server 2-1 receives the direct access URL transmitted from the DAP server 3.

In step S116, the service server 2-1 directly accesses the recording device 4-1 on the basis of the direct access URL, and transmits a reservation list acquisition request to the recording device 4-1.

In step S153, the recording device 4-1, in reply to the request from the service server 2-1, reads the reservation list managed by itself from the storage unit.

In step S154, the recording device 4-1 transmits the reservation list read from the storage unit to the service server 2-1.

In step S117, the service server 2-1 receives the reservation list transmitted from the recording device 4-1. Thus, using the direct access, the reservation list managed in the recording device 4-1 is acquired by the service server 2-1.

When the direct access to the recording device 4-1 is complete, a similar process will be executed on the recording device 4-2.

That is, the service server 2-1 executes a similar process to those in steps S114 to S117 on the recording device 4-2, and transmits a request for direct access to the recording device 4-2 to the DAP server 3.

The DAP server 3 executes a similar process to those in steps S133 to S136 in reply to the request from the service server 2-1, and acquires the direct access URL of the recording device 4-2. The DAP server 3 transmits the acquired direct access URL to the service server 2-1, and on the basis of the transmitted direct access URL, the service server 2-1 directly accesses the recording device 4-2. Through the request using the direct access, the service server 2-1 acquires a reservation list managed in the recording device 4-2.

When the direct access to the recording device 4-2 is complete, the service server 2-1 transmits a request for direct access to the recording device 4-3 to the DAP server 3.

The DAP server 3, in reply to the request from the service server 2-1, acquires the direct access URL of the recording device 4-3. The DAP server 3 transmits the acquired direct access URL to the service server 2-1, and, on the basis of the transmitted direct access URL, the service server 2-1 directly accesses the recording device 4-3. Through the request using the direct access, the service server 2-1 acquires a reservation list managed in the recording device 4-3.

In this way, the service server 2-1 acquires the reservation lists that are managed respectively in the recording devices 4-1 to 4-3.

In step S118, the service server 2-1 transmits the reservation lists of all the controlled devices to the mobile device 1.

In step S102, the mobile device 1 receives the reservation lists transmitted from the service server 2-1, and in step S103, reads a reservation list from the internal storage unit to acquire the reservation list managed by itself.

In step S104, the mobile device 1 integrates the reservation lists of the recording devices 4-1 to 4-3 with the reservation list managed by itself, and on the basis of the integrated reservation list, displays a list screen of the recording reservations set in the devices on the display.

The user reviews the recording reservations from the list screen shown in FIG. 3 and, where necessary, is able to change the recording site of the contents.

Next, the processes of the devices when the recording site of the recording target contents is changed from the mobile device 1 to the recording device 4-1 will be described with reference to a flowchart of FIG. 9.

The above processes are initiated when, on the list screen of the recording reservation shown in FIG. 3, the recording site of a piece of contents is changed from "Self-terminal" to "Device A", and then the update button b2 is pressed.

Because the recording reservations of which the recording sites of the contents are "Self-terminal" are set in the mobile device 1, first, these recording reservations are deleted from the mobile device 1. After those recording reservations are deleted, recording reservations for the same contents will be set in the recording device 4-1 that is newly specified as the recording site.

In step S161, the mobile device 1 deletes the recording reservations, to which recording site change is specified, from the reservation list managed by itself.

The process of step S162 and the following steps is similar to the process of remote recording reservation described with reference to FIG. 7.

In step S162, the mobile device 1 transmits a remote recording reservation request to the service server 2-1. The request from the mobile device 1 contains the control device-service management ID, the controlled device ID by which the recording device 4-1, which is the recording reservation setting destination, is specified, and reservation information. The reservation information contains the same contents of recording reservations as those deleted in step S161.

In step S171, the service server 2-1 receives the remote recording reservation request transmitted from the mobile device 1.

In step S172, the service server 2-1 transmits a request for initiating direct access to the DAP server 3. The request from the service server 2-1 contains the control device-service management ID and controlled device ID transmitted from the mobile device 1.

In step S191, the DAP server 3 receives a request from the service server 2-1.

In step S192, the DAP server 3 identifies the direct access target device as the recording device 4-1 on the basis of the controlled device ID transmitted from the service server 2-1. The DAP server 3 requests the recording device 4-1 to acquire direct access URL through a continuous session established between the DAP server 3 and the recording device 4-1.

In step S201, the recording device 4-1 receives the request transmitted from the DAP server 3, and performs settings for accepting direct access.

In step S202, the recording device 4-1 transmits the direct access URL to the DAP server 3.

In step S193, the DAP server 3 receives the direct access URL and in step S194, transmits the direct access URL to the service server 2-1.

In step S173, the service server 2-1 receives the direct access URL transmitted from the DAP server 3.

In step S174, the service server 2-1 directly accesses the recording device 4-1 on the basis of the direct access URL, and transmits the reservation information transmitted from the mobile device 1 to thereby perform remote recording reservation.

In step S203, the recording device 4-1 sets the recording reservations for the same contents as those of the recording reservations set in the mobile device 1 on the basis of the reservation information transmitted from the service server 2-1.

When the setting of the recording reservation is complete, in step S204, the recording device 4-1 notifies the service server 2-1 that the remote recording reservation is complete.

In step S175, the service server 2-1 receives the notice from the recording device 4-1, and in step S176, notifies the mobile device 1 that the remote recording reservation is complete.

In step S163, the mobile device 1 receives the notice transmitted from the service server 2-1.

Through the above processes, the user is able to record the contents, which were supposed to be recorded by the mobile device 1, by the recording device 4-1.

Next, the processes of the devices when the recording site of the recording target contents is changed from the recording device 4-1 to the mobile device 1 will be described with reference to a flowchart of FIG. 10.

The above processes are initiated when, on the list screen of the recording reservation shown in FIG. 3, the recording site of some contents is changed from "Device A" to "Self-terminal", and then the update button b2 is pressed.

Because the recording reservations of which the recording sites of the contents are "Device A" are set in the recording device 4-1, first, these recording reservations are deleted from the recording device 4-1. After those recording reservations are deleted, recording reservations for the same contents will be set in the mobile device 1 that is newly specified as the recording site.

In step S211, the mobile device 1 transmits a remote recording reservation deletion request to the service server 2-1. The request from the mobile device 1 contains the control device-service management ID, the controlled device ID of the recording device 4-1, in which the deletion target recording reservations are set, and reservation information. The reservation information contains the contents of the recording reservations to be deleted.

In step S221, the service server 2-1 receives the remote recording reservation deletion request transmitted from the mobile device 1.

In step S222, the service server 2-1 transmits a request for initiating direct access to the DAP server 3. The request from the service server 2-1 contains the control device-service management ID and controlled device ID transmitted from the mobile device 1.

In step S241, the DAP server 3 receives a request from the service server 2-1.

In step S242, the DAP server 3 identifies the recording device 4-1 as the direct access target device on the basis of the controlled device ID transmitted from the service server 2-1. The DAP server 3 requests the recording device 4-1 to acquire direct access URL through a continuous session established between the DAP server 3 and the recording device 4-1.

In step S251, the recording device 4-1 receives the request transmitted from the DAP server 3, and performs settings for accepting direct access.

In step S252, the recording device 4-1 transmits the direct access URL to the DAP server 3.

In step S243, the DAP server 3 receives the direct access URL, and in step S244, transmits the direct access URL to the service server 2-1.

In step S223, the service server 2-1 receives the direct access URL transmitted from the DAP server 3.

In step S224, the service server 2-1 directly accesses the recording device 4-1 on the basis of the direct access URL, and transmits the reservation information transmitted from the mobile device 1 to provide instruction for deleting the recording reservations.

In step S253, the recording device 4-1 deletes the recording reservations specified for deletion on the basis of the reservation information transmitted from the service server 2-1.

When the recording reservations are deleted, in step S254, the recording device 4-1 notifies the service server 2-1 that the recording reservation are deleted.

In step S225, the service server 2-1 receives the notice from the recording device 4-1, and in step S226, notifies the mobile device 1 that the recording reservations are deleted.

In step S212, the mobile device 1 receives the notice transmitted from the service server 2-1.

In step S213, the mobile device 1 sets the recording reservations for the same contents as those of the recording reservations set in the recording device 4-1.

Through the above processes, the user is able to record the contents, which were supposed to be recorded by the recording device 4-1, by the mobile device 1.

Figure 11:
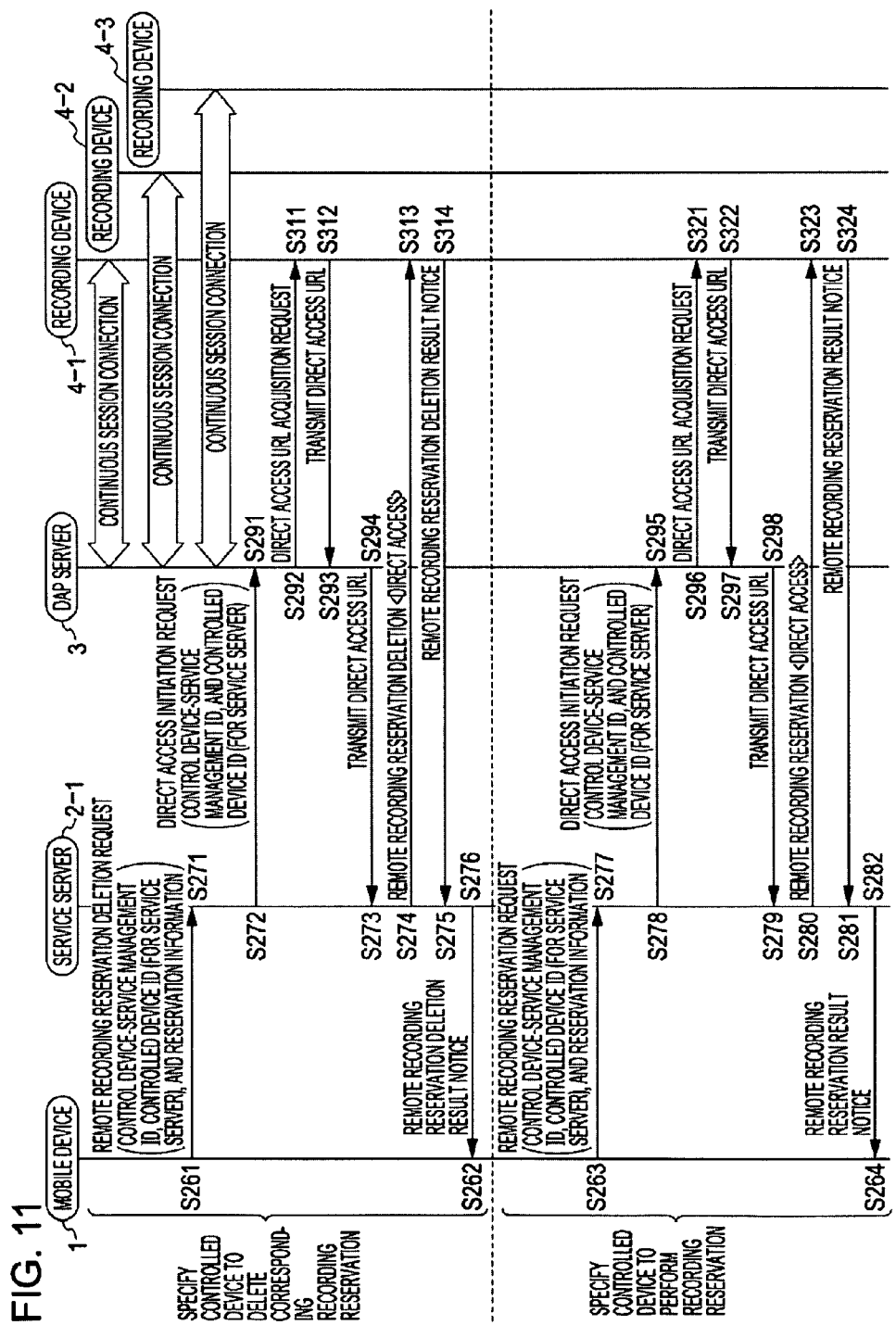
FIG. 11 is a flowchart that illustrates further another processes of devices when the recording site of the contents is changed.

Next, the processes of the devices when the recording site of the recording target contents is changed from the recording device 4-1 to the recording device 4-2 will be described with reference to a flowchart of FIG. 11.

The above processes are initiated when, on the list screen of the recording reservations shown in FIG. 3, the recording site of a piece of contents is changed from "Device A" to "Device B", and then the update button b2 is pressed.

Because the recording reservations of which the recording sites of the contents are "Device A" are set in the recording device 4-1, first, these recording reservations are deleted from the recording device 4-1. After those recording reservations are deleted, recording reservations for the same contents are set in the recording device 4-2 that is newly specified as the recording site.

That is, the above process is a combination of the process of deleting the recording reservations from a controlled device using direct access and the process of setting the recording reservations to a controlled device using direct access.

Figure 10:
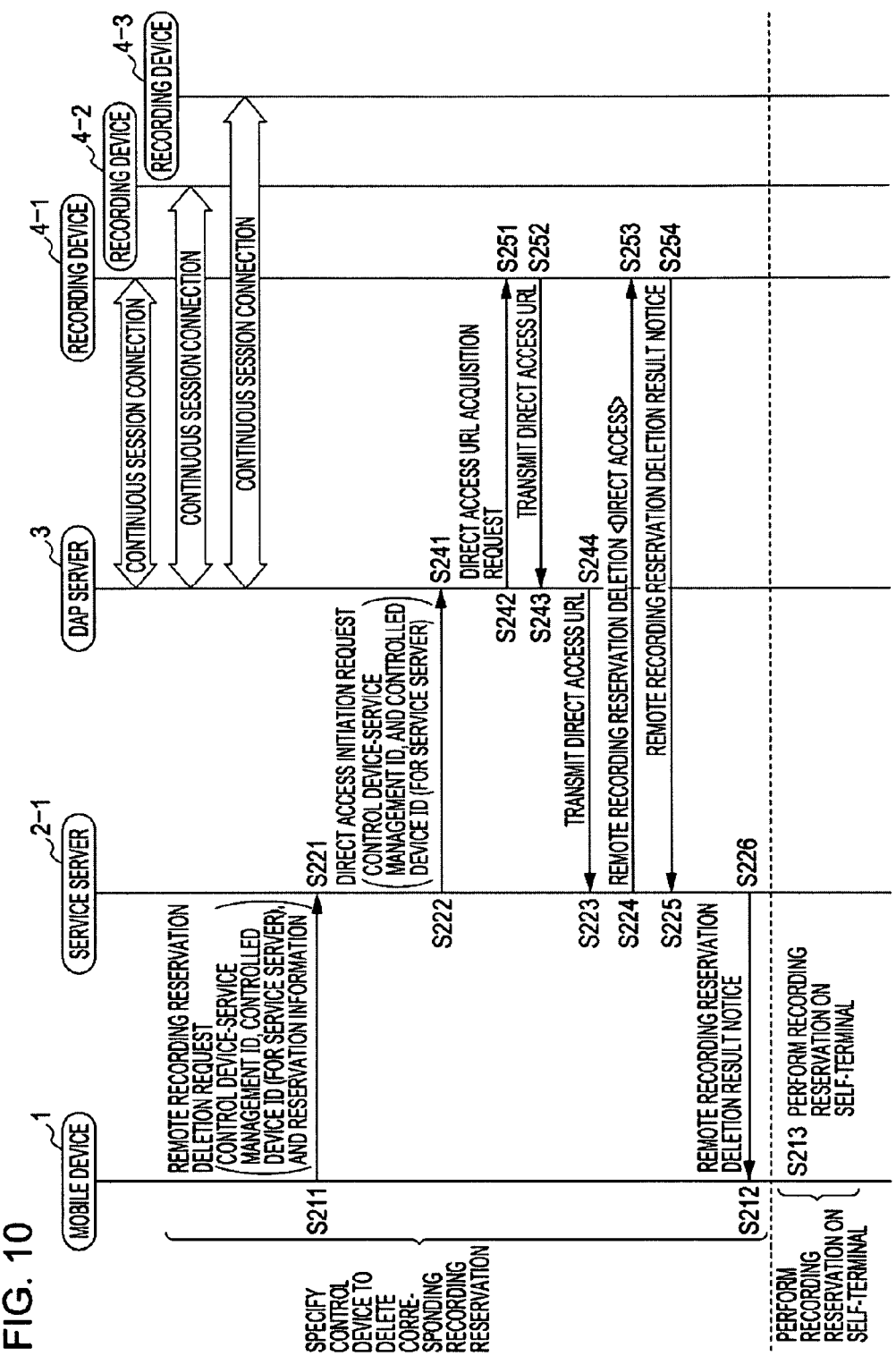
FIG. 10 is a flowchart that illustrates other processes of devices when the recording site of the contents is changed.

The process of deleting the recording reservations set in the recording device 4-1 is similar to that of FIG. 10 except the process of step S213.

In step S261, the mobile device 1 transmits a remote recording reservation deletion request to the service server 2-1. The request from the mobile device 1 contains the control device-service management ID, the controlled device ID of the recording device 4-1, in which the deletion target recording reservations are set, and reservation information. The reservation information contains the contents of the recording reservations to be deleted.

In step S271, the service server 2-1 receives the remote recording reservation deletion request transmitted from the mobile device 1.

In step S272, the service server 2-1 transmits a request for initiating direct access to the DAP server 3. The request from the service server 2-1 contains the control device-service management ID and controlled device ID transmitted from the mobile device 1.

In step S291, the DAP server 3 receives a request from the service server 2-1.

In step S292, the DAP server 3 identifies the direct access target device as the recording device 4-1 on the basis of the controlled device ID transmitted from the service server 2-1. The DAP server 3 requests the recording device 4-1 to acquire direct access URL through a continuous session established between the DAP server 3 and the recording device 4-1.

In step S311, the recording device 4-1 receives the request transmitted from the DAP server 3, and performs settings for accepting direct access.

In step S312, the recording device 4-1 transmits the direct access URL to the DAP server 3.

In step S293, the DAP server 3 receives the direct access URL and in step S294, transmits the direct access URL to the service server 2-1.

In step S273, the service server 2-1 receives the direct access URL transmitted from the DAP server 3.

In step S274, the service server 2-1 directly accesses the recording device 4-1 on the basis of the direct access URL, and transmits the reservation information transmitted from the mobile device 1 to provide instruction for deleting the recording reservations.

In step S313, the recording device 4-1 deletes the recording reservations specified for deletion on the basis of the reservation information transmitted from the service server 2-1.

When the recording reservations are deleted, in step S314, the recording device 4-1 notifies the service server 2-1 that the recording reservation are deleted.

In step S275, the service server 2-1 receives the notice from the recording device 4-1, and in step S276, notifies the mobile device 1 that the recording reservations are deleted.

In step S262, the mobile device 1 receives the notice transmitted from the service server 2-1.

Figure 9:
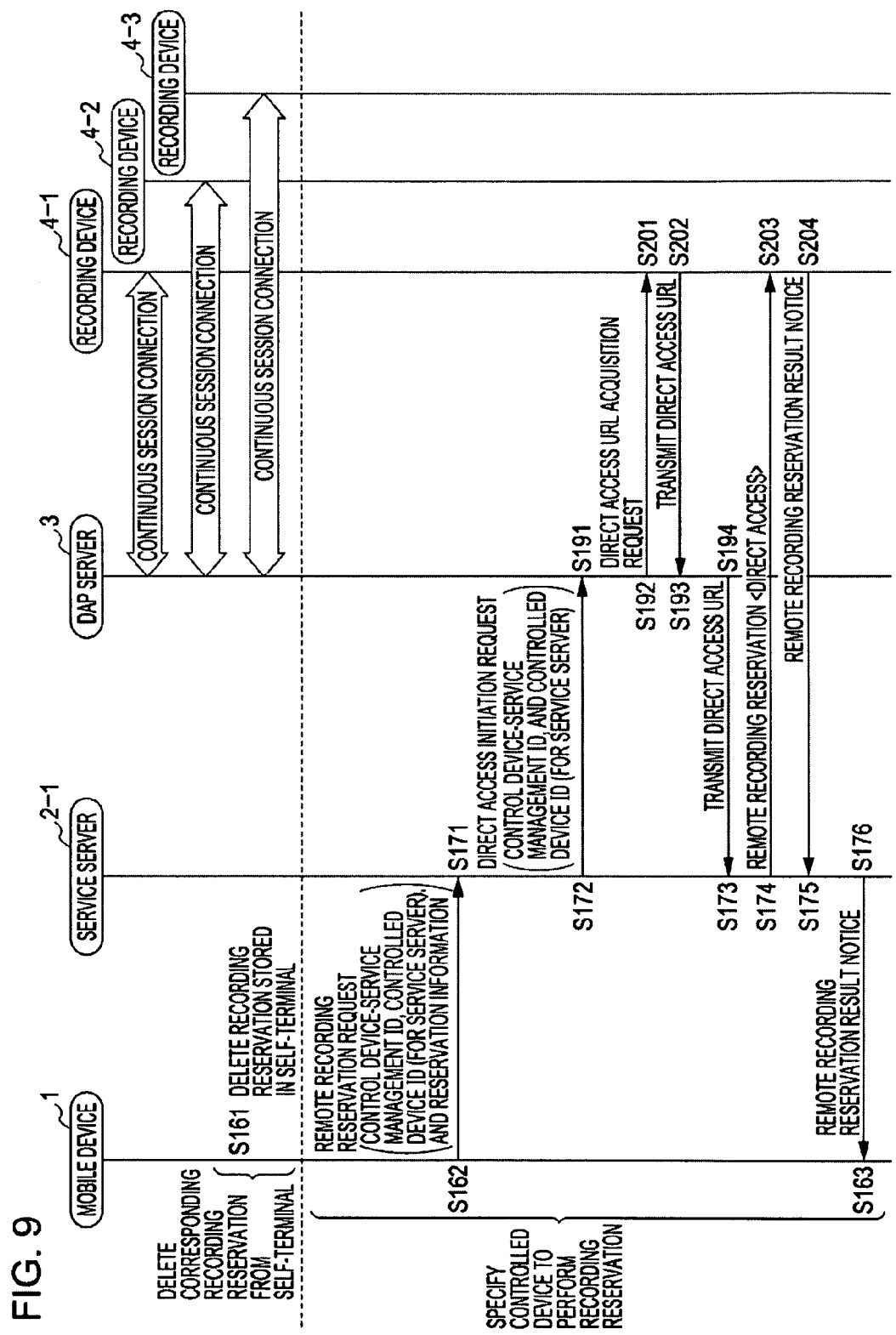
FIG. 9 is a flowchart that illustrates the processes of devices when the recording site of the contents is changed.

The process of setting the recording reservations in the recording device 4-2 is similar to that of FIG. 9 except the process of step S161.

In step S263, the mobile device 1 transmits a remote recording reservation request to the service server 2-1. The request from the mobile device 1 contains the control device-service management ID, the controlled device ID by which the recording device 4-2, which is the recording reservation setting destination, is specified, and reservation information. The reservation information contains the same contents of recording reservations as those deleted from the recording device 4-1.

In step S277, the service server 2-1 receives the remote recording reservation request transmitted from the mobile device 1.

In step S278, the service server 2-1 transmits a request for initiating direct access to the DAP server 3. The request from the service server 2-1 contains the control device-service management ID and controlled device ID transmitted from the mobile device 1.

In step S295, the DAP server 3 receives a request from the service server 2-1.

In step S296, the DAP server 3 identifies the recording device 4-2 as the direct access target device on the basis of the controlled device ID transmitted from the service server 2-1. The DAP server 3 requests the recording device 4-2 to acquire direct access URL through a continuous session established between the DAP server 3 and the recording device 4-2.

In step S321, the recording device 4-2 receives the request transmitted from the DAP server 3, and performs settings for accepting direct access.

In step S322, the recording device 4-2 transmits the direct access URL to the DAP server 3.

In step S297, the DAP server 3 receives the direct access URL and in step S298, transmits the direct access URL to the service server 2-1.

In step S279, the service server 2-1 receives the direct access URL transmitted from the DAP server 3.

In step S280, the service server 2-1 directly accesses the recording device 4-2 on the basis of the direct access URL, and transmits the reservation information transmitted from the mobile device 1 to thereby perform a remote recording reservation.

In step S323, the recording device 4-2 sets the recording reservations for the same contents as those of the recording reservations set in the recording device 4-1 on the basis of the reservation information transmitted from the service server 2-1.

When the setting of the recording reservations are complete, in step S324, the recording device 4-2 notifies the service server 2-1 that the setting of the recording reservations is complete.

In step S281, the service server 2-1 receives the notice from the recording device 4-2, and in step S282, notifies the mobile device 1 that the setting of the recording reservations is complete.

In step S264, the mobile device 1 receives the notice transmitted from the service server 2-1.

Through the above processes, the user is able to record the contents, which were supposed to be recorded by the recording device 4-1, by the recording device 4-2.

In the above processes, when the recording site of the recording target contents is changed, the recording reservations set in the source device are deleted first and then the recording reservations are set in the destination device. Instead, the recording reservations may be set in the destination device first and then the recording reservations set in the source device may be deleted.

In addition, the process intended for broadcast contents is described above. Instead, the target contents may be downloaded contents or streaming contents provided through the Internet. For the downloaded contents, or the like, as well, the process of integrating reservation lists of the contents and the process of changing a device as the recording site may be executed.

Of course, a reservation list intended for broadcast contents may be integrated with a reservation list intended for downloaded contents or streaming contents, and then the process of displaying a list screen of recording reservations may be performed.

Next, the configuration of the devices will be described.

Figure 12:
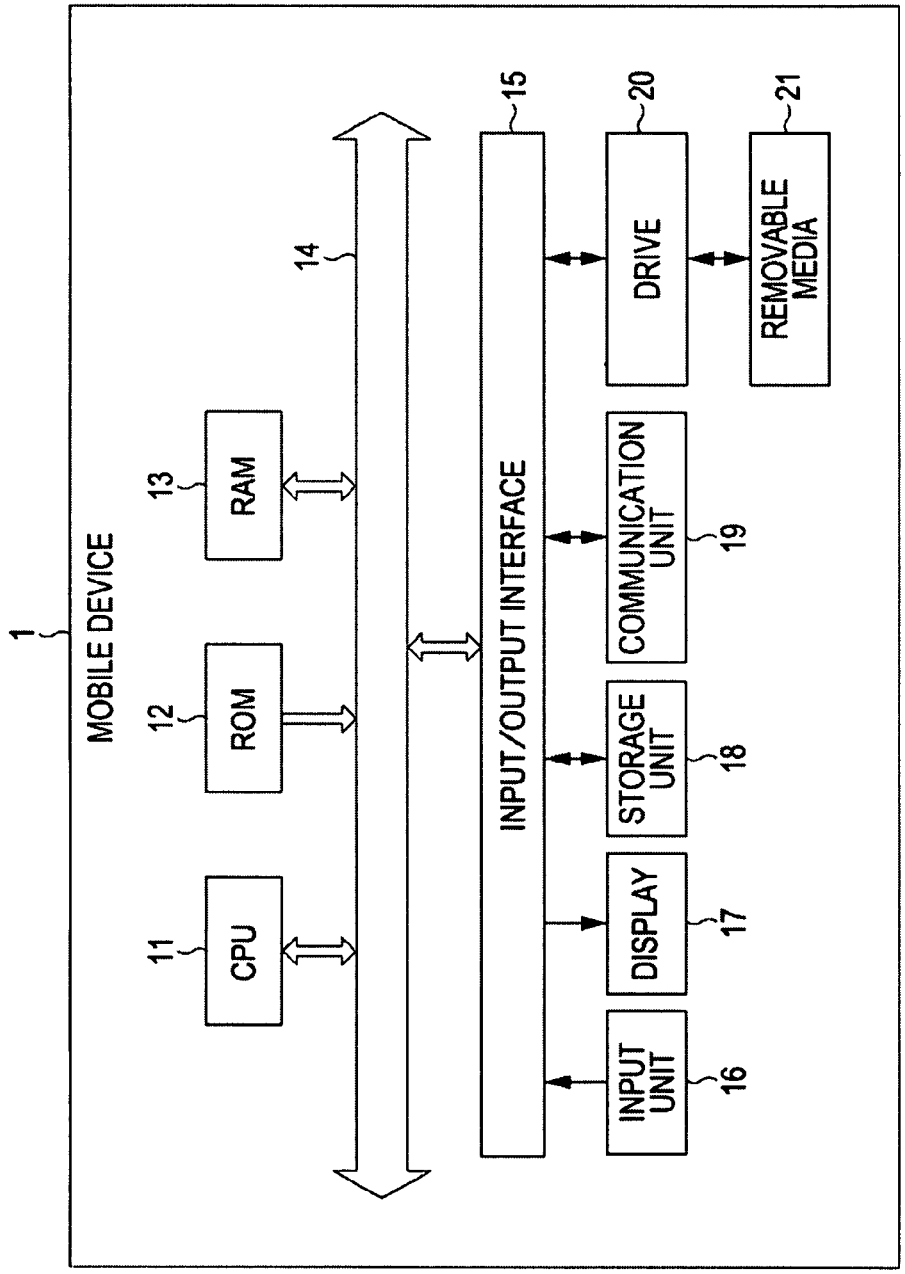
FIG. 12 is a block diagram that shows an example of portion of the hardware configuration of a mobile device.

FIG. 12 is a block diagram that shows an example of portion of the hardware configuration of the mobile device 1.

When the mobile device 1 is a cellular phone that supports one-segment broadcasting, the mobile device 1 includes not only the configuration for implementing verbal communication function and the configuration for implementing receiving and recording function of one-segment broadcasting but also the configuration shown in FIG. 12.

A central processing unit (CPU) 11, a read only memory (ROM) 12, and a random access memory (RAM) 13 are connected with one another through a bus 14.

An input/output interface 15 is further connected to the bus 14. The input/output interface 15 is connected to an input unit 16 formed of a numeric key pad, an arrow key, a determination button operated when various items are selected, or the like, a display 17 formed of a liquid crystal display (LCD), or the like, a storage unit 18 formed of a nonvolatile memory, or the like, a communication unit 19 that communicates with the service server 2-1, and a drive 20 that drives a removable media 21 such as a memory card.

In the mobile device 1, the CPU 11 executes a program stored in the ROM 12 or the storage unit 18 to perform the above described series of processes.

The service server 2-1, DAP server 3, recording device 4-1, and the like, also have the configuration similar to that shown in FIG. 12.

Figure 13:
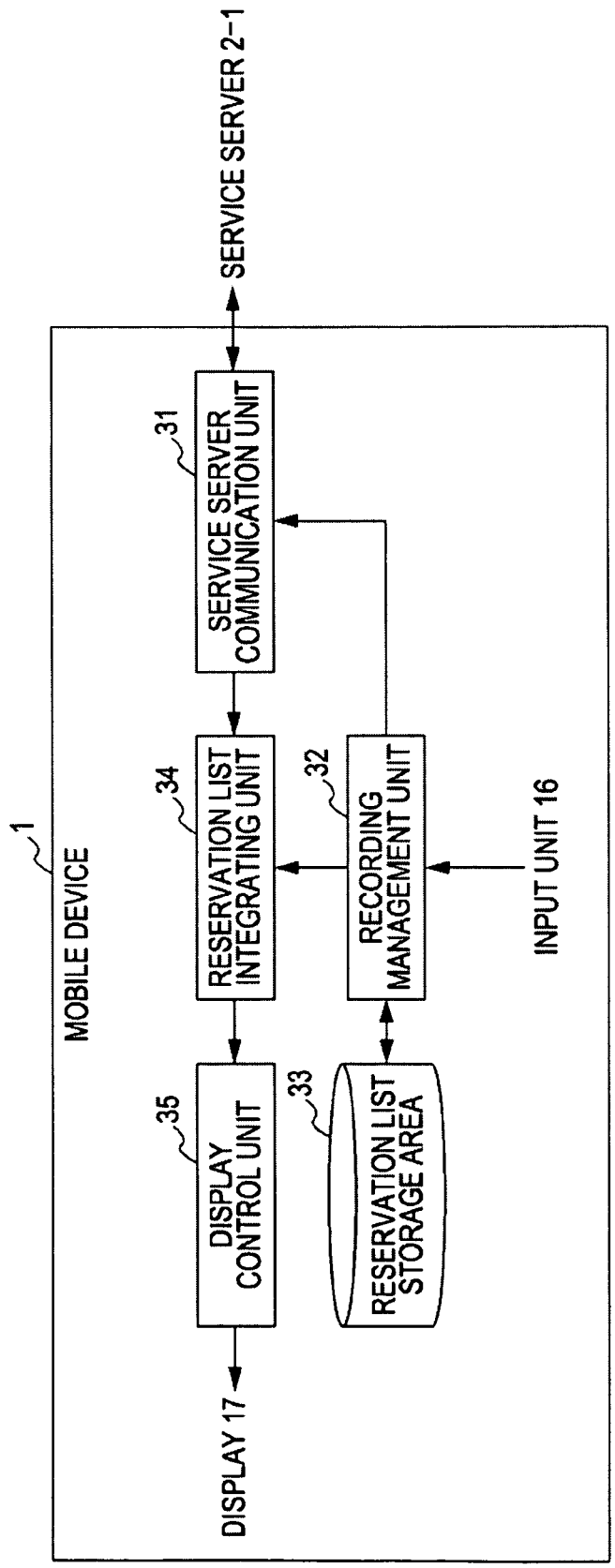
FIG. 13 is a block diagram that shows an example of a functional configuration of the mobile device.

FIG. 13 is a block diagram that shows an example of a functional configuration of the mobile device 1. At least portion of the functional units shown in FIG. 13 are implemented by a predetermined program executed by the CPU 11 of FIG. 12.

As shown in FIG. 13, the mobile device 1 includes a service server communication unit 31, a recording management unit 32, a reservation list storage area 33, a reservation list integrating unit 34, and a display control unit 35.

The service server communication unit 31 communicates with the service server 2-1 to transmit various requests, such as a remote recording reservation request or a request for acquiring a reservation list managed in a controlled device.

In addition, the service server communication unit 31 receives information transmitted from the service server 2-1 in reply to a request. For example, when the reservation list managed in the controlled device is transmitted from the service server 2-1, the service server communication unit 31 receives the reservation list, and outputs the acquired reservation list to the reservation list integrating unit 34.

The recording management unit 32 writes the contents of the recording reservations into the reservation list stored in the reservation list storage area 33, and manages the recording reservations. The recording management unit 32, when the broadcast of the recording target contents is started, controls a recording unit (not shown) to perform recording in accordance with the contents described in the reservation list.

The recording management unit 32 sets a recording reservation in response to user's input to the input unit 16, reads the reservation list from the reservation list storage area 33 when instructed to display a list screen of the recording reservations shown in FIG. 3, or outputs the read reservation list to the reservation list integrating unit 34.

In addition, the recording management unit 32, when the recording site of the contents is instructed to change from the mobile device 1 to another device through the list screen of the recording reservations, deletes the recording reservation for that contents from the reservation list and outputs the reservation information that contains the contents of the deleted recording reservation to the service server communication unit 31. On the basis of the above reservation information, the recording reservation is set in a destination device as the recording site.

The reservation list storage area 33 is formed in the storage unit 18 and stores a reservation list.

The reservation list integrating unit 34 integrates a reservation list supplied from the service server communication unit 31 with a reservation list supplied from the recording management unit 32, and outputs the integrated reservation list to the display control unit 35.

The display control unit 35 instructs the display 17 to display a list screen of the recording reservations on the basis of the reservation list supplied from the reservation list integrating unit 34.

Figure 14:
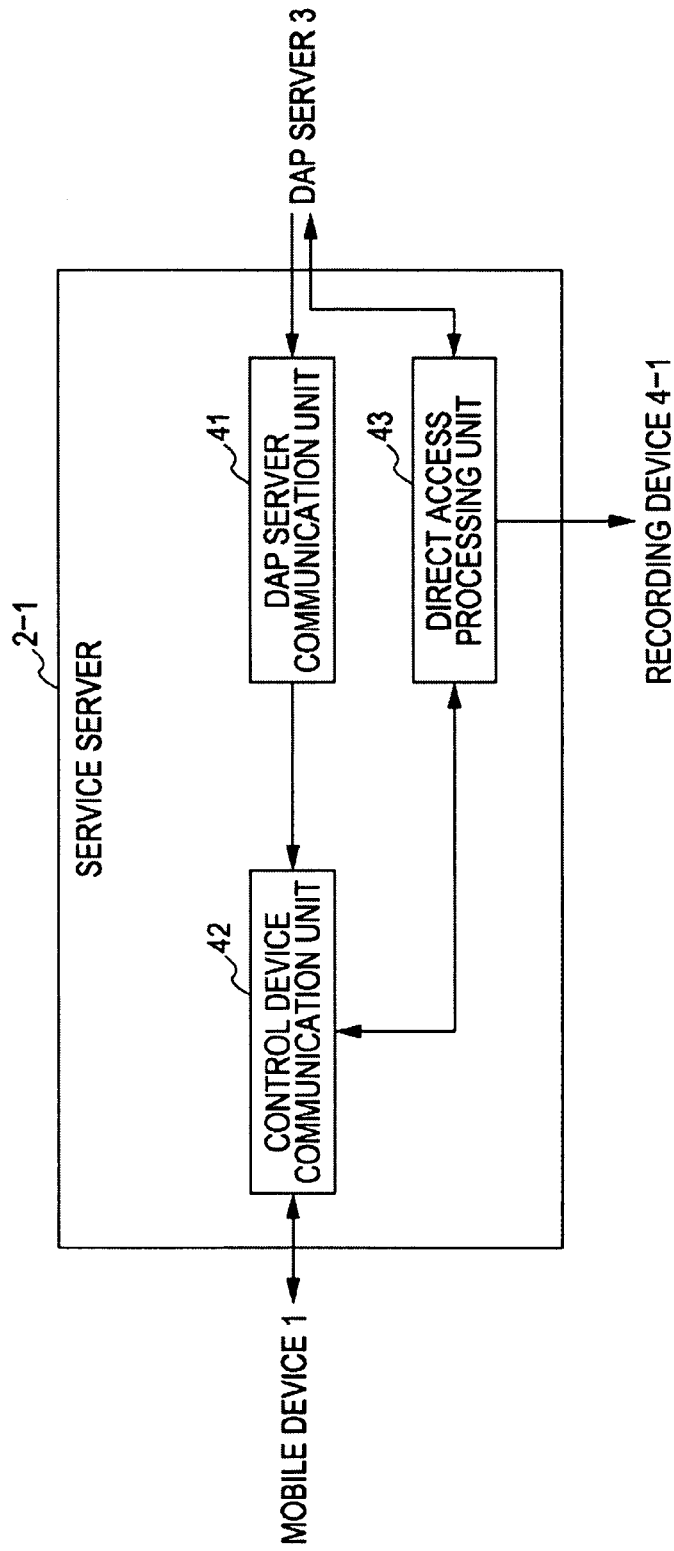
FIG. 14 is a block diagram that shows an example of a functional configuration of a service server.

FIG. 14 is a block diagram that shows an example of a functional configuration of the service server 2-1. At least portion of the functional units shown in FIG. 14 are implemented by a predetermined program executed by the CPU of the service server 2-1.

As shown in FIG. 14, the service server 2-1 includes a DAP server communication unit 41, a control device communication unit 42, and a direct access processing unit 43.

The DAP server communication unit 41 communicates with the DAP server 3 and, for example, requests the DAP server 3 for a controlled device list. The DAP server communication unit 41 receives information, such as a controlled device list, transmitted from the DAP server 3, and outputs the received information to the control device communication unit 42.

The control device communication unit 42 communicates with the mobile device 1, which is the control device, and transmits the controlled device list supplied from the DAP server communication unit 41 to the mobile device 1 or receives various requests from the mobile device 1.

The control device communication unit 42 instructs the direct access processing unit 43 to perform direct access in reply to a request from the mobile device 1, and transmits the reservation list acquired from the controlled device in the direct access processing unit 43 to the mobile device 1.

The direct access processing unit 43, when directly accesses the recording device 4-1, communicates with the DAP server 3 to acquire information for direct access. The direct access processing unit 43 directly accesses the recording device 4-1 on the basis of the acquired information, and instructs the recording device 4-1 to execute a process in accordance with user's instruction.

Figure 15:
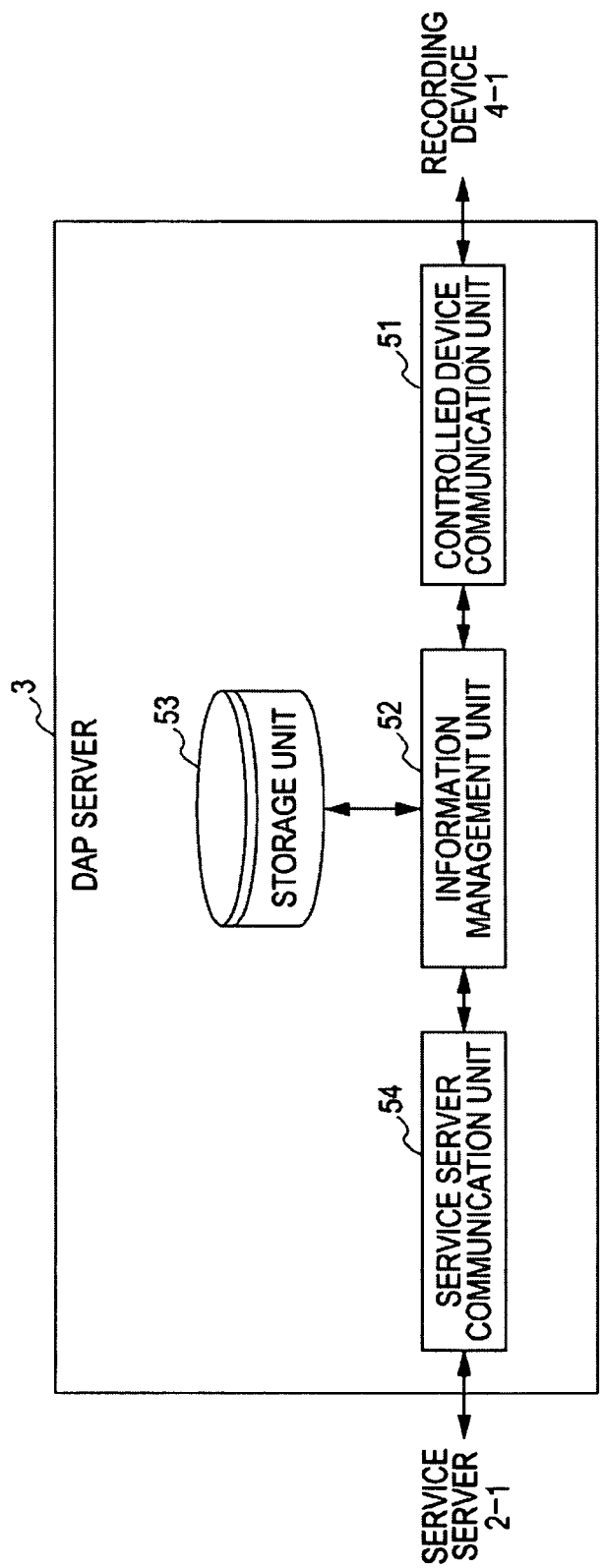
FIG. 15 is a block diagram that shows an example of a functional configuration of a DAP server.

FIG. 15 is a block diagram that shows an example of a functional configuration of the DAP server 3. At least portion of the functional units shown in FIG. 15 are implemented by a predetermined program executed by the CPU of the DAP server 3.

As shown in FIG. 15, the DAP server 3 includes a controlled device communication unit 51, an information management unit 52, a storage unit 53, and a service server communication unit 54.

The controlled device communication unit 51 establishes a continuous session with the recording device 4-1, and communicates with the recording device 4-1. In addition, the controlled device communication unit 51, at the time of initial registration, receives information, such as registration password, transmitted from the recording device 4-1, and outputs the received registration password to the information management unit 52.

The information management unit 52 generates a registration password, a control device-service management ID, and a controlled device ID, instructs the service server communication unit 54 to output the generated information to the service server 2-1, and stores the generated information in the storage unit 53 for management. The information management unit 52, at the time of initial registration, determines whether the registration password supplied from the controlled device communication unit 51 coincides with the one stored in the storage unit 53, and also authenticates the validity of a controlled device.

In addition, the information management unit 52, when a direct access initiation request is transmitted from the service server 2-1 and supplied through the service server communication unit 54, controls the controlled device communication unit 51 to access the recording device 4-1 and instructs the recording device 4-1 to perform various settings. The information management unit 52 outputs information that is acquired by providing instruction for various settings and used for direct access to the service server communication unit 54, and instructs the service server communication unit 54 to transmit the information to the service server 2-1.

The service server communication unit 54 communicates with the service server 2-1, and, for example, when initiation of direct access is requested from the service server 2-1, outputs the request to the information management unit 52. The service server communication unit 54, when information for direct access is acquired by the information management unit 52 and supplied from the information management unit 52, transmits the information to the service server 2-1.

Figure 16:
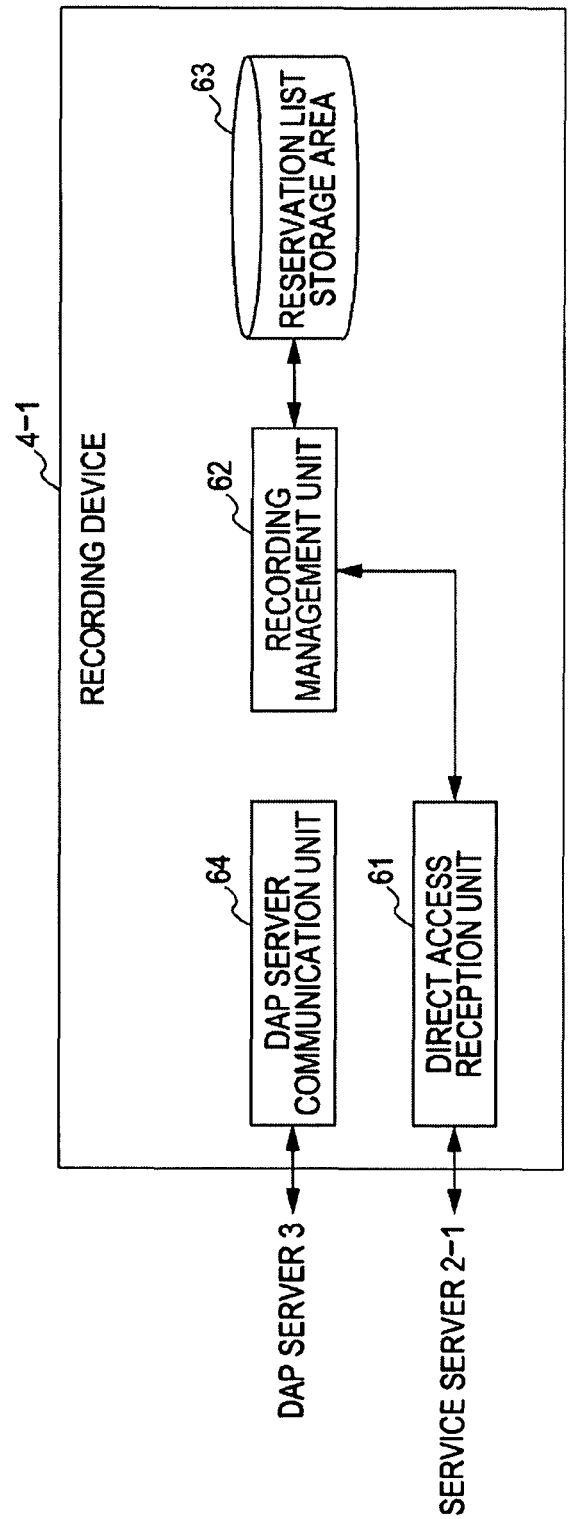
FIG. 16 is a block diagram that shows an example of a functional configuration of a recording device.

FIG. 16 is a block diagram that shows an example of a functional configuration of the recording device 4-1. At least portion of the functional units shown in FIG. 16 are implemented by a predetermined program executed by the CPU of the recording device 4-1.

As shown in FIG. 16, the recording device 4-1 includes a direct access accepting unit 61, a recording management unit 62, a reservation list storage area 63, and a DAP server communication unit 64.

The direct access accepting unit 61 accepts direct access from the service server 2-1, and notifies the recording management unit 62 of the request from the service server 2-1 through direct access. For example, the direct access accepting unit 61, when reading of the reservation list is requested or when setting or deletion of a recording reservation is requested, notifies the recording management unit 62 of that request.

In addition, the direct access accepting unit 61 transmits the reservation-list supplied from the recording management unit 62 to the service server 2-1, or notifies the service server 2-1 of the result of setting or deletion of the recording reservation, performed by the recording management unit 62.

The recording management unit 62 writes the contents of the recording reservations in the reservation list stored in the reservation list storage area 63 and manages the recording reservations. The recording management unit 62, when the broadcast of the recording target contents is started, controls a recording unit (not shown) to perform recording in accordance with the contents described in the reservation list.

The DAP server communication unit 64 establishes a continuous session with the DAP server 3 and communicates with the DAP server 3.

The above described series of processes may be executed by hardware or may be executed by software. When the series of processes are executed by software, a program that constitutes the software is installed in a computer assembled to exclusive hardware or installed in a general-purpose personal computer that is able to execute various functions by installing various programs.

The installed program may be provided by being recorded on a removable media 21, shown in FIG. 12, such as an optical disc (compact disc-read only memory (CD-ROM), digital versatile disc (DVD), and the like) or a semiconductor memory, or may be provided through wired or wireless transmission media, such as a local area network, the internet, or digital broadcasting. The program may be installed in the ROM 12 or in the storage unit 18 in advance.

Note that the program executed by a computer may execute processes in time sequence in the order described in the specification or may execute processes in parallel or at a selected timing at which the program is called.

The embodiments of the invention are not restrictive, and various modifications are applicable without departing from the scope of the invention.

What is claimed is:

1. A portable device comprising:
a setting means that sets a recording reservation;
an acquisition means that, when instructed to display a list of recording reservations, acquires information that indicates the contents of a recording reservation set in a recording device by requesting an information processing device;
an integrating means contained in the portable device that combines a recording reservation set in the portable device with the recording reservation set in the recording device,
wherein the portable device allows checking of the contents of both the recording reservation set in the portable device and the recording reservation set in the recording device, wherein the contents comprise broadcast data, and selecting at least one of the portable device and the recording device as the recording site, wherein the portable device is capable of being the recording site; and
a display control means that displays the contents of the recording reservation set in the portable device and the contents of the recording reservation set in the recording device on the basis of the recording reservations combined by the integrating means, and displays information that indicates which recording site the contents will be recorded in, the recording medium of the portable device or a recording medium of the recording device, when recorded in accordance with the respective recording reservations, wherein
the information processing device, when requested from the portable device, accesses the recording device to acquire the information that indicates the contents of the recording reservation set in the recording device and then transmits the information to the portable device, and wherein
the acquisition means acquires the information transmitted from the information processing device.

2. The portable device according to claim 1, wherein
the setting means, when the recording site of the contents when recorded in accordance with a predetermined recording reservation is instructed to change from the recording medium of the portable device to the recording medium of the recording device, deletes the predetermined recording reservation and requests the information processing device to set a recording reservation of the contents, which is the recording target of the predetermined recording reservation, in the recording device, and wherein
the information processing device, when requested from the portable device, accesses the recording device and instructs the recording device to set a recording reservation of the requested contents.

3. The portable device according to claim 1, wherein
the setting means, when the recording site of the contents when recorded in accordance with a predetermined recording reservation is instructed to change from the recording medium of the recording device to the recording medium of the portable device, sets a recording reservation of the contents, which is the recording target of the predetermined recording reservation, and requests the information processing device to delete the predetermined recording reservation from the recording device, and wherein
the information processing device, when requested from the portable device, accesses the recording device and instructs the recording device to delete the recording reservation of the requested contents.

4. The portable device according to claim 1, wherein the information processing device, when requested from the portable device, instructs an information processing device, which is continuously connected to the recording device through a network, to acquire information for accessing the recording device, and accesses the recording device on the basis of the acquired information.

5. An information processing method for a portable device that has a recording medium and that is connected to an information processing device through a network, comprising the steps of:

setting a recording reservation;

when instructed to display a list of recording reservations, acquiring information that indicates the contents of a recording reservation set in a recording device by requesting the information processing device;

in the portable device, combining a recording reservation set in the portable device with the recording reservation set in the recording device, wherein the portable device allows checking of the contents of both the recording reservation set in the portable device and the recording reservation set in the recording device, wherein the contents comprise broadcast data, and selecting at least one of the portable device and the recording device as the recording site, wherein the portable device is capable of being the recording site;

displaying the contents of the recording reservation set in the portable device and the contents of the recording reservation set in the recording device on the basis of the combined recording reservations, and displaying information that indicates which recording site the contents will be recorded in, the recording medium of the portable device or a recording medium of the recording device, when recorded in accordance with the respective recording reservations;

in the information processing device, when requested from the portable device, accessing the recording device to acquire the information that indicates the contents of the recording reservation set in the recording device and then transmitting the information to the portable device; and acquiring the information, transmitted from the information processing device, that indicates the contents of the recording reservation set in the recording device.

6. A non-transitory storage medium storing a program, executable on a computer, for executing information processing on a portable device that has a recording medium and that is connected to an information processing device through a network, the program comprising the steps of:

setting a recording reservation;

when instructed to display a list of recording reservations, acquiring information that indicates the contents of a recording reservation set in a recording device by requesting the information processing device;

in the portable device, combining a recording reservation set in the portable device with the recording reservation set in the recording device, wherein the portable device allows checking of the contents of both the recording reservation set in the portable device and the recording reservation set in the recording device, wherein the contents comprise broadcast data, and selecting at least one of the portable device and the recording device as the recording site, wherein the portable device is capable of being the recording site;

displaying the contents of the recording reservation set in the portable device and the contents of the recording reservation set in the recording device on the basis of the combined recording reservations, and displaying information that indicates which recording site the contents will be recorded in, the recording medium of the portable device or a recording medium of the recording device, when recorded in accordance with the respective recording reservations;

in the information processing device, when requested from the portable device, accessing the recording device to acquire the information that indicates the contents of the recording reservation set in the recording device and then transmitting the information to the portable device; and acquiring the information transmitted from the information processing device, that indicates the contents of the recording reservation set in the recording device.

7. A portable device comprising:

a setting unit that sets a recording reservation;

an acquisition unit that, when instructed to display a list of recording reservations, acquires information that indicates the contents of a recording reservation set in a recording device by requesting an information processing device;

an integrating unit contained in the portable device that combines a recording reservation set in the portable device with the recording reservation set in the recording device, wherein the portable device allows checking of the contents of both the recording reservation set in the portable device and the recording reservation set in the recording device, wherein the contents comprise broadcast data, and selecting at least one of the portable device and the recording device as the recording site, wherein the portable device is capable of being the recording site; and a display controller that displays the contents of the recording reservation set in the portable device and the contents of the recording reservation set in the recording device on the basis of the recording reservations combined by the integrating unit, and displays information that indicates which recording site the contents will be recorded in, the recording medium of the portable device or a recording medium of the recording device, when recorded in accordance with the respective recording reservations, wherein the information processing device, when requested from the portable device, accesses the recording device to acquire the information that indicates the contents of the recording reservation set in the recording device and then transmits the information to the portable device, and wherein the acquisition unit acquires the information transmitted from the information processing device.

* * * * *